US008549349B2

(12) United States Patent
Yuhara et al.

(10) Patent No.: US 8,549,349 B2
(45) Date of Patent: *Oct. 1, 2013

(54) STORAGE CONTROLLER AND STORAGE CONTROL METHOD

(75) Inventors: Atsushi Yuhara, Yugawara (JP); Masao Nakano, Odawara (JP); Takao Sato, Odawara (JP); Kazunobu Ohashi, Odawara (JP); Takahiko Takeda, Minamiashigara (JP)

(73) Assignee: Hitachi, Ltd., Tokyo (JP)

( * ) Notice: Subject to any disclaimer, the term of this patent is extended or adjusted under 35 U.S.C. 154(b) by 311 days.

This patent is subject to a terminal disclaimer.

(21) Appl. No.: 13/023,150

(22) Filed: Feb. 8, 2011

(65) Prior Publication Data

US 2011/0126058 A1 May 26, 2011

Related U.S. Application Data

(63) Continuation of application No. 12/123,057, filed on May 19, 2008, now Pat. No. 7,913,112.

(30) Foreign Application Priority Data

Mar. 11, 2008 (JP) ................. 2008-061573

(51) Int. Cl.
G06F 11/00 (2006.01)

(52) U.S. Cl.
USPC ......................................... 714/5.1

(58) Field of Classification Search
USPC ......................................... 714/5.1
See application file for complete search history.

(56) References Cited

U.S. PATENT DOCUMENTS 5,463,763 A 10/1995 Kubo

| 2003/0101258 A1 | 5/2003 | Parham |
| 2004/0093508 A1 | 5/2004 | Foerstner et al. |
| 2004/0103261 A1 | 5/2004 | Honda et al. |
| 2007/0168565 A1 | 7/2007 | Yuhara et al. |
| 2007/0180188 A1 | 8/2007 | Fujibayashi et al. |
| 2011/0125964 A1 | 5/2011 | Fujibayashi et al. |

FOREIGN PATENT DOCUMENTS

| DE | 3731097 | 3/1989 |
| DE | 10235564 | 2/2004 |
| EP | 1818794 | 8/2007 |
| GB | 2267372 | 12/1993 |
| JP | 02125361 | 5/1990 |
| JP | 2007-207007 | 8/2007 |

OTHER PUBLICATIONS

Japanese Office Action mailed Feb. 28, 2012 in corresponding Japanese Patent Application No. 2008-061573 with partial English language translation.

(Continued)

*Primary Examiner* — Bryce Bonzo
(74) *Attorney, Agent, or Firm* — Brundidge & Stanger, P.C.

(57) ABSTRACT

This storage controller includes a port unit and multiple processing units for inputting and outputting data to and from a storage apparatus. The port unit sorts the data I/O requests given from a host system to the corresponding processing units according to a table pre-defining the storage apparatus or a storage area in the storage apparatus to perform data I/O processing allocated to each of the processing units. The processing unit inputs data in the corresponding storage apparatus or the corresponding storage area according to the data I/O request sorted to itself from the port unit and, upon detecting a blockage of the other processing unit due to a failure, updates the table retained in each of the port units so as to sort the storage apparatuses or the storage areas allocated to the other processing unit to the remaining unblocked processing units.

14 Claims, 21 Drawing Sheets

(56) References Cited

OTHER PUBLICATIONS

Search Report in European Application No. 09250035.4—2224, mailed Apr. 6, 2009.

Hughes-Fenchel, G, "A Flexible Clustered Approach to High Availability", Fault-Tolerant Computing, 1997, FTCS-27. Digest of Papers., Twenty-Seventh Annual International Symposium on Seattle, WA, USA, 24-27, Jun. 1997, Los Alamitos, CA, Jun. 24, 1997, pp. 314-318.

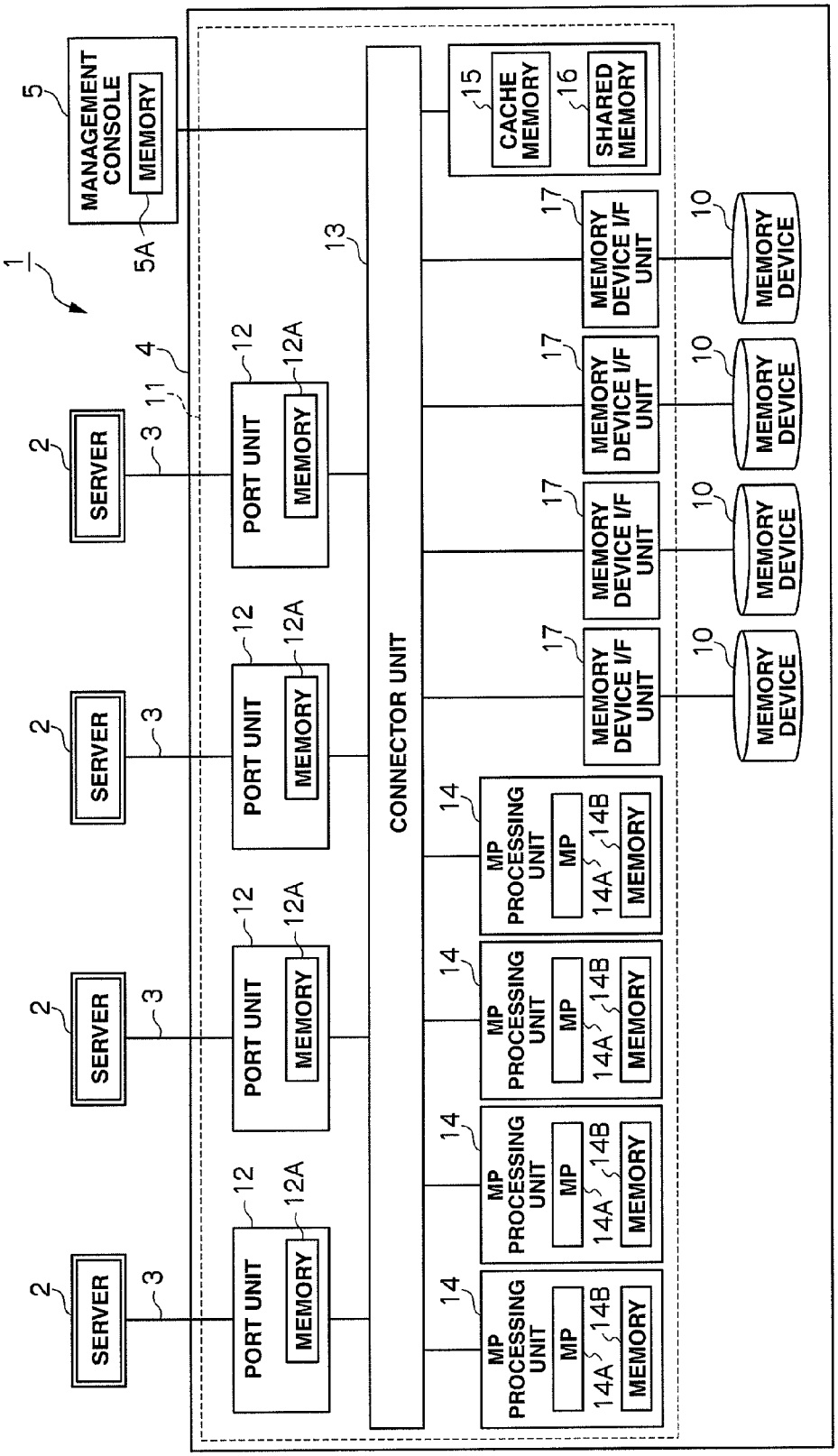

FIG.2

| MP PROCESSING UNIT NUMBER | STATUS | VALID WORD COUNT | PROCESSING TARGET MEMORY DEVICE BITMAP |
|---|---|---|---|
| 1 | NORMAL | 3 | 111111111111····· |
| 2 | NORMAL | 3 | 000000000000····· |
| 3 | NORMAL | 3 | 000000000000····· |
| ⋮ | ⋮ | ⋮ | ⋮ |

| | | | |
|---|---|---|---|
| 21A { PORT UNIT COUNT | STATUS BITMAP | | } 21H |
| 21B { MP PROCESSING UNIT COUNT | STATUS BITMAP | | } 21I |
| 21C { CACHE MEMORY COUNT | CAPACITY/STATUS | BITMAP | } 21J |
| 21D { SHARED MEMORY COUNT | CAPACITY/STATUS | BITMAP | } 21K |
| 21E { MEMORY DEVICE I/F UNIT COUNT | STATUS BITMAP | | } 21L |
| 21F { MEMORY DEVICE COUNT | STATUS BITMAP | | } 21M |
| 21G { BROADCAST TABLE | BACKUP AREA | | } 21N |

21

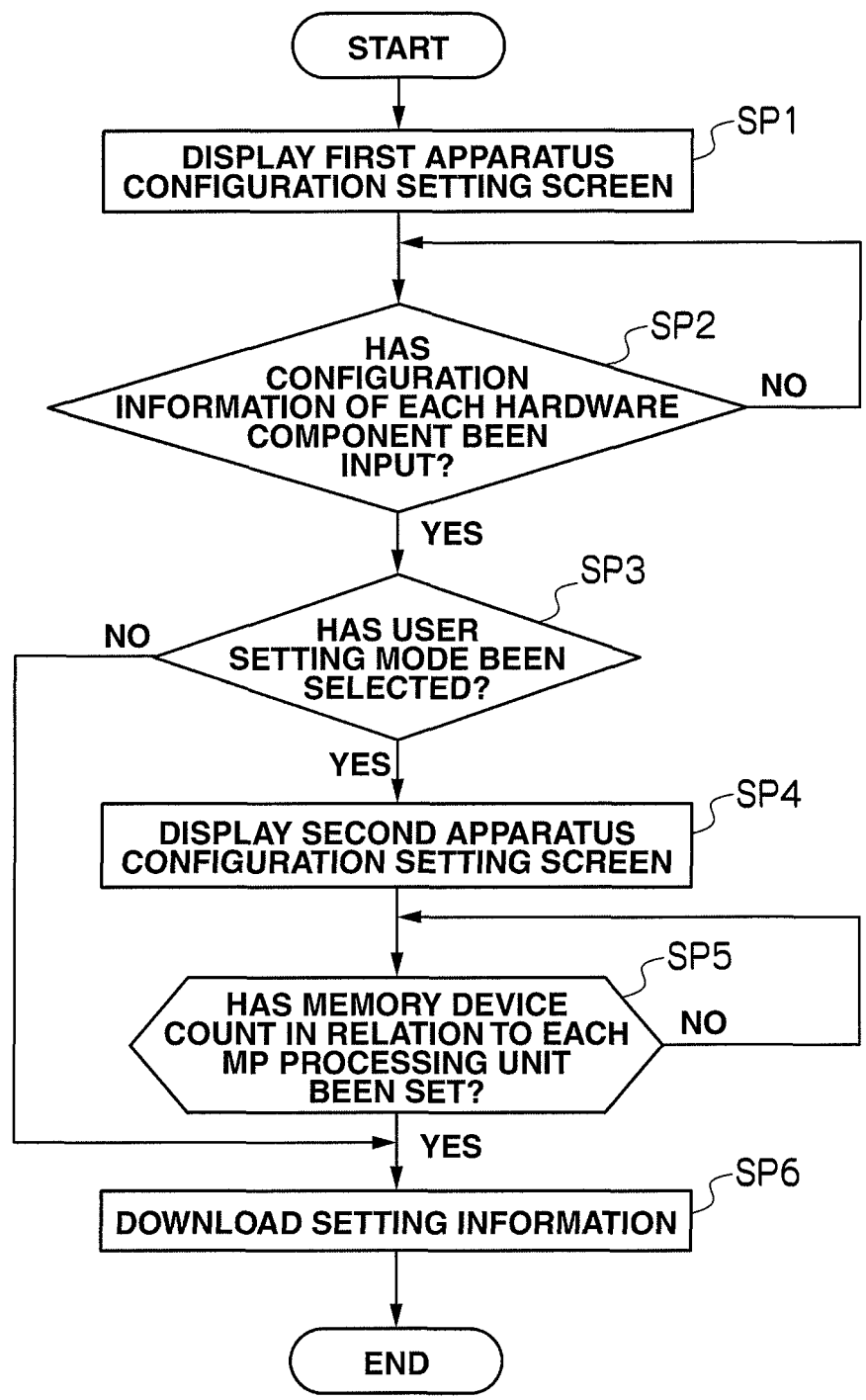

FIG.6

| MP PROCESSING UNIT 1 | MP PROCESSING UNIT 2 | MP PROCESSING UNIT 3 | MP PROCESSING UNIT 4 | ..... |
|---|---|---|---|---|
| 1 | 0 | 1 | 1 | ..... |

23

| MP PROCESSING UNIT 1 | MP PROCESSING UNIT 2 | MP PROCESSING UNIT 3 | MP PROCESSING UNIT 4 | ..... |
|---|---|---|---|---|
| 21:00:30 | 21:03:22 | 21:01:42 | 21:04:01 | ..... |

| MEMORY DEVICE 1 | MEMORY DEVICE 2 | MEMORY DEVICE 3 | MEMORY DEVICE 4 | ..... |
|---|---|---|---|---|
| 132 | 231 | 553 | 313 | ..... |

| MP PROCESSING UNIT NUMBER | PROCESSING TARGET MEMORY DEVICE COUNT | MEMORY DEVICE UTILIZATION (I/O COUNT) ACCUMULATION |
|---|---|---|
| 1 | 100 | 15721 |
| 2 | 100 | 10329 |
| ⋮ | ⋮ | ⋮ |

27A  27B  27C

27

STORAGE CONTROLLER AND STORAGE CONTROL METHOD

This application is a continuation application of U.S. application Ser. No. 12/123,057, filed May 19, 2008, now U.S. Pat. No. 7,913,112, the entirety of which is incorporated herein by reference.

CROSS-REFERENCES

This application relates to and claims priority from Japanese Patent Application No. 2008-061573, filed on Mar. 11, 2008, the entire disclosure of which is incorporated herein by reference.

BACKGROUND

The present invention relates to a storage controller and a storage control method, and can be suitably applied to a storage apparatus that independently separates a port unit that functions as an interface to a host and a microprocessor that performs data I/O processing to the storage apparatus for configuring hardware settings.

For example, with a database system that handles large volumes of data such as in a data center, data is managed using a storage system configured separately from a host computer. This storage system is configured, for instance, from one or more storage apparatuses.

A storage apparatus is configured by arranging a plurality of memory devices in an array and created based on RAID (Redundant Array of Independent Inexpensive Disks) or the like. At least one logical volume is formed in a physical storage area provided by the memory device group, and this volume is provided to the host. The host is able to read and write data from and to the volume by sending prescribed commands.

Conventionally, proposed is technology for improving the access performance of a storage apparatus by independently separating an interface to be connected to a host and a processor for performing data I/O processing to a disk drive in this kind of storage apparatus, and the interface transferring an access request from the host to a corresponding processor based on pre-stored routing information (refer to Japanese Patent Laid-Open Publication No. 2007-207007).

SUMMARY

Meanwhile, in recent years, the number of applications, the number of servers and the amount of data are of an increasing trend in a user IT (Information Technology) environment. Under these circumstances, there are the following problems in maintaining the performance of the overall storage apparatus in accordance with the number of applications, the number of servers and the amount of data in such storage apparatus.

If a processor is blocked due to a failure or the like, since the data I/O request from a host to be processed with the blocked processor is processed with another processor in the same package, the data I/O requests will be concentrated on the other processor and cause an overload, and there is a problem in that the data I/O performance in the processor will deteriorate.

In addition, if the package is blocked due to a failure or the like, the package is not able to receive a data I/O request from the host. Here, if alternate path software for issuing a data I/O request to an alternate path in this case is installed in the host in advance, although it will be possible to perform data I/O using another package, the data I/O requests will be concentrated on the other package set with the alternate path and cause an overload, and there is a problem in that the data I/O performance in the other package will deteriorate.

In addition, by the package being loaded with a function for requesting the data I/O request from the host to another package (hereinafter referred to as a "lateral allocation"), it is possible to seek the alleviation of the load of the package concentrated with data I/O requests. Nevertheless, since the reply to the host and the lateral allocation processing must be performed by a processor associated with a port, there is a problem in that the bottleneck of the processor associated with the port cannot be completely overcome.

The present invention was made in view of the foregoing points. Thus, an object of the present invention is to propose a storage controller and a storage control method capable of improving fault tolerance.

In order to achieve the foregoing object, the present invention provides a storage controller comprising a plurality of processing units for inputting and outputting data to and from a storage apparatus, and a port unit for sorting a data I/O request from a host system to a corresponding processing unit according to a pre-retained table. The table retained in each of the port units is updated so as to sort the storage apparatuses or the like allocated to the blocked processing unit to another processing unit.

Specifically, the storage controller comprises a port unit that functions as an interface to a host system, and a plurality of processing units for inputting and outputting data to and from a corresponding storage apparatus according to a data I/O request given from the host system via the port unit. The port unit retains a table pre-defining the storage apparatus or a storage area in the storage apparatus to perform data I/O processing allocated to each of the processing units, and sorts the data I/O requests given from the host system to the corresponding processing units according to the table. The processing unit inputs data in the corresponding storage apparatus or the corresponding storage area according to the data I/O request sorted to itself from the port unit and, upon detecting a blockage of the other processing unit due to a failure, updates the table retained in each of the port units so as to sort the storage apparatuses or the storage areas allocated to the other processing unit to the remaining unblocked processing units.

The present invention additionally provides a storage control method in a storage controller comprising a port unit that functions as an interface to a host system, and a plurality of processing units for inputting and outputting data to and from a corresponding storage apparatus according to a data I/O request given from the host system via the port unit. This storage control method comprises a first step of the port unit sorting the data I/O requests given from the host system to the corresponding processing units according to a table pre-defining the storage apparatus or a storage area in the storage apparatus to perform data I/O processing allocated to each of the processing units, and a second step of the processing unit inputting data in the corresponding storage apparatus or the corresponding storage area according to the data I/O request sorted to itself from the port unit and, upon detecting a blockage of the other processing unit due to a failure, updating the table retained in each of the port units so as to sort the storage apparatuses or the storage areas allocated to the other processing unit to the remaining unblocked processing units.

According to the present invention, even if one of the processing units is blocked due to a failure, it is possible to perform data I/O processing without disruption to the storage apparatus or the storage area that was allocated to the blocked processing unit and without the load being concentrated on certain processing units among the other processing units. Consequently, it is possible to realize a storage controller and a storage control method capable of improving fault tolerance.

DESCRIPTION OF DRAWINGS

FIG. 1 is a block diagram showing the overall configuration of a storage system according to the first embodiment;

FIG. 2 is a conceptual diagram explaining a distributed arrangement table;

FIG. 3 is a conceptual diagram explaining an apparatus configuration information table;

FIG. 4 is a flowchart showing a processing routine of first table initialization setting processing;

FIG. 6 is a conceptual diagram explaining a broadcast table;

FIG. 22 is a conceptual diagram explaining a storage apparatus utilization management table;

FIG. 23 is a conceptual diagram explaining a microprocessor processing unit utilization management table;

DETAILED DESCRIPTION

Figure 5:
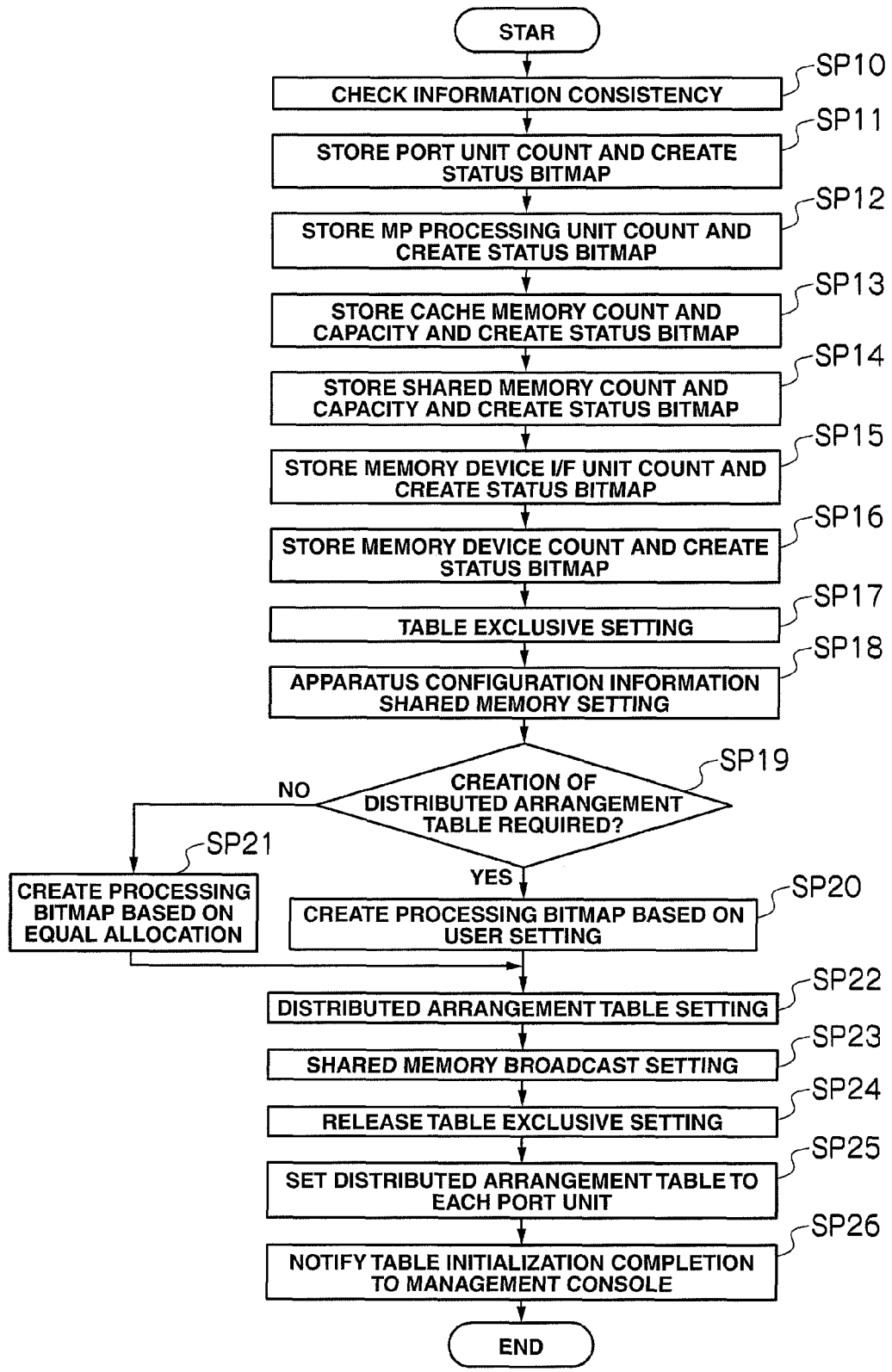
FIG. 5 is a flowchart showing a processing routine of second table initialization setting processing.

An embodiment of the present invention is now explained in detail with reference to the attached drawings.

(1) First Embodiment

(1-1) Configuration of Storage System in Present Embodiment

FIG. 1 shows the overall storage system 1 according to the present embodiment. The storage system 1 is configured by each of the host servers as a plurality of host systems being connected to a storage apparatus 4 via a communication network 3 such as a SAN (Storage Area Network) or an IP (Internet Protocol) network, and the storage apparatus 4 being connected to a management console 5.

The host server 2 is a computer device comprising information processing resources such as a CPU (Central Processing Unit) and a memory, and is configured from a personal computer, a workstation, a mainframe or the like. The host server 2 comprises an information input module such as a keyboard, a switch, a pointing device, or a microphone, and an information output module such as a monitor display or a speaker. The host server 2 is provided with an adapter (for instance, an HBA (Host Bus Adapter)) that functions as an interface for accessing the storage apparatus via the communication network 3.

The storage apparatus 4 is configured from a plurality of memory devices 10, and a control unit 11 for controlling the input and output of data to and from the memory devices 10.

The memory devices 10 are respectively configured from a plurality of hard disk devices. As the hard disk devices, for instance, used are expensive disks such as FC (Fibre Channel) disks or inexpensive disks such as SATA (Serial AT Attachment) disks, and these hard disk devices 10 are operated in RAID (Redundant Array of Inexpensive Disks) format by the control unit 11. One or more logical volumes are created in a storage area provided by one or more hard disk devices, and these volumes are provided to the host server 2 as the area for reading and writing data. The memory devices 10 may also be configured from flexible disks, magnetic tapes, semiconductor memories such as flash memories, or optical disks.

The control unit 11 is configured from a plurality of port units 12, a connector unit 13, a plurality of microprocessor processing units 14, a cache memory 15, a shared memory 16, and a plurality of memory device interface units 17.

The port unit 12 functions as an interface for sending and receiving data to and from the host server 2, and comprises a communication port (not shown) and a memory 12A. The communication port is allocated with a port address such as an IP (Internet Protocol) address or a WWN (World Wide Address) (hereinafter referred to as "WWN") for identifying the respective ports on the communication network.

The connector unit 13 has the function of mutually connecting the respective port units 12, the respective microprocessor processing units 14, the cache memory 15, the shared memory 16, and the respective memory device interface units 17, and is configured from a switch such as an ultrafast cross device switch or a bus for performing data transmission by way of high-speed switching. The sending and receiving of data and commands among the respective port units 12, the respective microprocessor processing units 14, the cache memory 15, the shared memory 16, and the respective memory device interface units 17 are conducted via the connector unit 13.

The microprocessor processing unit 14 comprises one or more microprocessors 14A, a memory 14B, and so on. The microprocessor 14A executes the control programs (hereinafter referred to as the "micro programs") stored in the memory 14B, and thereby executes the various types of processing described later of the overall microprocessor processing unit 14.

The cache memory 15 and the shared memory 16 are memories to be shared by the port unit 12, the microprocessor processing unit 14, and the memory device interface unit 17. The cache memory 15 is primarily used for temporarily storing data to be read from and written into the memory device 10. The shared memory 16 is primarily used for storing control information to be referred to and updated by the microprocessor processing unit 14.

The memory device interface unit 17 functions as an interface for reading and writing corresponding data from and into the memory device 10 according to a request from the microprocessor processing unit 14.

The management console 5 is a computer device comprising information processing resources such as a CPU and a memory 5A, and configured from a personal computer or the like. The management console 5 comprises an information input module (not shown) such as a keyboard, a switch, a pointing device, or a microphone, and an information output module (not shown) such as a monitor display or a speaker. The management console 5 is used by a user for configuring various settings to the storage apparatus 4 and detecting a failure in the storage apparatus 4.

(1-2) Data I/O Request Sorting Function Loaded in Storage Apparatus (1-2-1) Configuration of Various Tables The data I/O request sorting function loaded in the storage apparatus 4 is now explained. In the ensuing explanation, for the sake of convenience of explanation, let it be assumed that each microprocessor processing unit 14 is packaged, and only one microprocessor 14A is loaded in one microprocessor processing unit 14.

In the storage apparatus 4, a memory device 10 to perform the data I/O processing to the respective microprocessors 14A is allocated in advance. If each port unit 12 receives a data I/O request from the host server 2, it transfers the data I/O request to the microprocessor processing unit 14 loaded with the microprocessor 14A to perform the data I/O processing to the memory device 10 designated in the data I/O request.

As means for each port unit 12 to perform this kind of sorting processing of data I/O requests, the memory 12A of each port unit 12 stores a distributed arrangement table 20 as shown in FIG. 2.

The distributed arrangement table 20 is a table to be referred to by the port unit 12 when managing the memory devices 10 respectively allocated to each of the microprocessor processing units 14 and determining the transfer destination of the data I/O request when a data I/O request is given from the host server 2. As shown in FIG. 2, the distributed arrangement table 20 is configured from a microprocessor processing unit number column 20A, a status column 20B, a valid word count column 20C, and a processing target memory device bitmap column 20D.

The microprocessor processing unit number column 20A stores an identification number (hereinafter referred to as the "microprocessor processing unit number") given to each microprocessor processing unit 14 in the storage apparatus 4. The status column 20B stores the current status of the corresponding microprocessor processing unit 14. As the status of the microprocessor processing unit 14 there are "Normal" representing that the microprocessor processing unit 14 is operating normally, "Blocked" representing that the microprocessor processing unit 14 is blocked, "Changing to Maintenance Block" representing that the microprocessor processing unit 14 is changing to the maintenance blocked status described later, and "Unloaded" representing that it is a status that the microprocessor processing unit 14 is not loaded.

The processing target memory device bitmap column 20D stores a bitmap (hereinafter referred to as the "processing target memory device bitmap") provided with bits corresponding to the respective memory devices 10 in the storage apparatus 4. In the processing target memory device bitmap, only the bits associated with the memory device 10 allocated to the corresponding microprocessor processing unit 14 are set to "ON (1)."

The valid word count column 20C stores the valid word count in the processing target memory device bitmap stored in the corresponding processing target memory device bitmap column 20D. In the case of this embodiment, the bits in the processing target memory device bitmap are managed in multiple bit (for instance, 32-bit) units. The multiple bits as the management unit are referred to as one word. A valid word count is the word count representing up to which word from the top word the word (valid word) in which one of the bits is set to "ON" in the corresponding processing target memory device bitmap is set. Accordingly, if the valid word count is "12," this means that the corresponding microprocessor processing unit 14 is allocated with one or more storage apparatuses associated with one of the bits up to the $12^{th}$ word. Here, even if none of the storage apparatuses corresponding to the bits of the $1^{st}$ word to the $9^{th}$ word are allocated to the corresponding microprocessor processing unit 14 and one or more storage apparatuses are allocated to one of the bits of the $10^{th}$ word to the $12^{th}$ word, the valid word count will still be "12."

Meanwhile, the shared memory 16 stores an apparatus configuration information table 21 to be referred to by the microprocessor processing unit 14 as necessary as described later.

The apparatus configuration information table 21 is a table for managing the hardware configuration of the storage apparatus 4 and the status of each hardware component. As shown in FIG. 3, the apparatus configuration information table 21 is configured from a port unit count column 21A, a microprocessor processing unit count column 21B, a cache memory count column 21C, a shared memory count column 21D, a storage apparatus interface unit count column 21E, a memory device count column 21F, a broadcast table column 21G, a port unit status bitmap column 21H, a microprocessor processing unit status bitmap column 21I, a cache memory capacity/status bitmap column 21J, a shared memory capacity/status bitmap column 21K, a storage apparatus interface unit status bitmap column 21L, a storage apparatus status bitmap column 21M, and a backup area column 21N.

The port unit count column 21A, the microprocessor processing unit count column 21B, the cache memory count column 21C, the shared memory count column 21D, the storage apparatus interface unit count column 21E, and the memory device count column 21F store the number of corresponding hardware components (port unit 12, microprocessor processing unit 14, cache memory 15, shared memory 16, memory device interface unit 17 or memory device 10) in the respective storage apparatuses 4, and the broadcast table column 21G stores the broadcast table 23 to be explained later with reference to FIG. 6.

The port unit status bitmap column 21H, the microprocessor processing unit status bitmap column 21I, the cache memory capacity/status bitmap column 21J, the shared memory capacity/status bitmap column 21K, the storage apparatus interface unit status bitmap column 21L, and the storage apparatus status bitmap column 21M store the status bitmap representing the status (normal or abnormal) of each of the corresponding hardware components. The cache memory capacity/status bitmap column 21J and the shared memory capacity/status bitmap column 21K store, in addition to the foregoing status bitmap, the capacity of the respective cache memories 15 or the respective shared memories 16 existing in the storage apparatus 4.

(1-2-2) Setting and Update of Distributed Arrangement Table (1-2-2-1) Table Initialization Processing The foregoing distributed arrangement table 20 and the apparatus configuration information table 21 are created and set based on the user's setting operation input using the management console 5.

FIG. 4 shows the processing contents of the management console 5 concerning the initialization of the distributed arrangement table 20 and the apparatus configuration information table 21. The management console 5 executes the first table initialization processing shown in FIG. 4 based on a control program stored in the memory 5A.

Specifically, when the management console 5 boots the corresponding control program according to the user operation, it foremost displays a prescribed first apparatus configuration setting screen not shown (SP1).

Subsequently, the management console 5 waits for the user to input, at the prescribed locations in the first apparatus configuration setting screen, apparatus configuration information such as the number of port units 12, microprocessor processing units 14, cache memories 15, shared memories 16, memory device interface units 17 and memory devices 10 in the storage apparatus 4, and the capacity of the respective cache memories 15 and the respective shared memories 16 (SP2).

When the apparatus configuration information is input, the management console 5 determines whether a mode (hereinafter referred to as the "user setting mode") where the user sets the number of memory devices 10 to be allocated to each microprocessor processing unit 14 (in reality, each microprocessor 14A) in the first apparatus configuration setting screen (SP3).

The management console 5 proceeds to step SP6 upon obtaining a negative result in this determination. Meanwhile, if the management console 5 obtains a positive result in this determination, it displays a prescribed second apparatus configuration setting screen not shown (SP4), and waits for the user to use this second apparatus configuration setting screen and set the number of memory devices 10 to be allocated to each microprocessor processing unit 14 (SP5).

When the number of memory devices 10 to be allocated to each microprocessor processing unit 14 is set by the user with the second apparatus configuration setting screen, the management console 5 sends, as user setting apparatus configuration information, the foregoing apparatus configuration information set using the first and second apparatus configuration setting screens, information regarding whether the user setting mode was selected as the method for determining the number of memory devices 10 to be allocated to each microprocessor processing unit 14, and the number of memory devices 10 to be allocated to each microprocessor processing unit 14 if the user setting mode was selected to the storage apparatus 4 (SP6). The management console 5 thereafter ends this first table initialization processing.

Meanwhile, FIG. 5 shows the processing contents of the microprocessor processing unit 14 of the storage apparatus 4 concerning the initialization of the distributed arrangement table 20 and the apparatus configuration information table 21. The second table initialization processing shown in FIG. 5 is executed by the microprocessor processing unit 14 that initially received the user setting apparatus configuration information sent from the management console 5 according to the micro program stored in the memory 14B of the microprocessor processing unit 14.

Specifically, when the microprocessor processing unit 14 receives the user setting apparatus configuration information, it starts the second table initialization processing, and foremost checks the consistency of the received user setting apparatus configuration information. In particular, the microprocessor processing unit 14 checks the consistency of the user setting apparatus configuration information based on check sum or the like (SP10).

Subsequently, the microprocessor processing unit 14 stores the port unit count contained in the user setting apparatus configuration information in the port unit count column 21A of the apparatus configuration information table 21, creates a status bitmap of the port unit 12 based on the port unit count, and stores this in the port unit status bitmap column 21H of the apparatus configuration information table 21 (SP11).

The microprocessor processing unit 14 stores the microprocessor processing unit count contained in the user setting apparatus configuration information in the microprocessor processing unit count column 21B of the apparatus configuration information table 21, creates a status bitmap of the microprocessor processing unit 14 based on the microprocessor processing unit count, and stores this in the microprocessor processing unit status bitmap column 21I of the apparatus configuration information table 21 (SP12).

The microprocessor processing unit 14 stores the cache memory count and capacity of each cache memory 15 contained in the user setting apparatus configuration information respectively in the cache memory count column 21C and the cache memory capacity/status bitmap column 21J of the apparatus configuration information table 21, creates a status bitmap of the cache memory based on the cache memory count, and stores this in the cache memory status bitmap column 21J of the apparatus configuration information table 21 (SP13).

Similarly, the microprocessor processing unit 14 stores the shared memory count and capacity of each shared memory 16 contained in the user setting apparatus configuration information respectively in the shared memory count column 21D and the shared memory capacity/status bitmap column 21K of the apparatus configuration information table 21, creates a status bitmap of the shared memory 16 based on the shared memory count, and stores this in the shared memory capacity/status bitmap column 21K of the apparatus configuration information table 21 (SP14).

The microprocessor processing unit 14 stores, as with the processing at step SP11 and step SP12, the storage apparatus interface unit count and the memory device count contained in the user setting apparatus configuration information respectively in the storage apparatus interface unit count column 21E and the memory device count column 21F of the apparatus configuration information table 21, creates a status bitmap of the memory device interface unit 17 and a status bitmap of the memory device 10 based on the storage apparatus interface unit count and the memory device count, and stores these in the storage apparatus interface unit status bitmap column 21L or the storage apparatus status bitmap column 21M of the apparatus configuration information table 21 (SP15, SP16).

As a result of the foregoing processing, the apparatus configuration information table 21 based on the user setting apparatus configuration information from the management console 5 is created. The processing from step SP10 to step SP16 is performed in the memory 14B in the microprocessor processing unit 14 that received the user setting apparatus configuration information.

Subsequently, the microprocessor processing unit 14 performs exclusive setting to prevent other microprocessor processing units 14 or the like from updating the distributed arrangement table 20 and the apparatus configuration information table 21 in the shared memory 16 (SP17), and thereafter stores the apparatus configuration information table 21 created in the memory 14B of the self-microprocessor processing unit in a prescribed area of the shared memory 16 (SP18).

Subsequently, the microprocessor processing unit 14 determines whether the user setting mode has been selected as the method for determining the number of memory devices 10 to be allocated to each microprocessor processing unit 14 based on the user setting apparatus configuration information (SP19). If the microprocessor processing unit 14 obtains a positive result in this determination, the processing target memory device bitmap that allocates the memory devices 10 to each microprocessor processing unit 14 according to the memory device count for each microprocessor processing unit 14 set by the user is created for each microprocessor processing unit 14 (SP20).

Meanwhile, if the microprocessor processing unit 14 obtains a negative result in the determination at step SP19, it creates the processing target memory device bitmap that evenly allocates the same number of memory devices 10 to each microprocessor processing unit 14 in order from the smallest storage apparatus number is created for each microprocessor processing unit 14 (SP21).

The microprocessor processing unit 14 thereafter creates the distributed arrangement table 20 based on the processing target memory device bitmap created at step SP20 or step SP21, and replicates the created distributed arrangement table 20 in a prescribed area of the shared memory 16 (SP22).

The microprocessor processing unit 14 thereafter creates a broadcast table 23 as shown in FIG. 6. The broadcast table 23 is a bitmap where bits are correspondingly provided to each microprocessor processing unit 14 in the storage apparatus 4, and bits associated with the target microprocessor processing unit 14 are set to "ON (1)", and bits associated with all other microprocessor processing units 14 are set to "OFF (0)."

In the case of this embodiment, in order to cause the other microprocessor processing units 14 to load new distributed arrangement table 20 and the apparatus configuration information table 21 respectively stored in the shared memory 16 at step SP20 and step SP21, in the broadcast table 23 to be created at step SP23, the bits associated with the microprocessor processing unit 14 that created the new distributed arrangement table 20 and the like are set to "OFF," and the other bits associated with all other microprocessor processing units 14 are set to "ON."

The microprocessor processing unit 14 stores the broadcast table 23 created as described above in the broadcast table column 21G of the apparatus configuration information table 21 (FIG. 3) stored in the shared memory 16 (SP23), and thereafter releases the exclusive setting to the distributed arrangement table 20 (SP24).

Subsequently, the microprocessor processing unit 14 sends the new distributed arrangement table 20 stored in the shared memory 16 at step SP22 to each port unit 12 (SP25). Consequently, each port unit 12 stores the received distributed arrangement table 20 in the memory 12A of the self-port unit.

The microprocessor processing unit 14 notifies the completion of initialization of the distributed arrangement table 20 and the apparatus configuration information table 21 to the management console 5 (SP26), and thereafter ends this table initialization processing.

Meanwhile, the distributed arrangement table 20 and the apparatus configuration information table 21 created as described above are read from the shared memory 16 by each microprocessor processing unit 14 other than the microprocessor processing unit 14 that created these tables, and stored and retained in the memory 14B of such microprocessor processing units 14.

Figure 7:
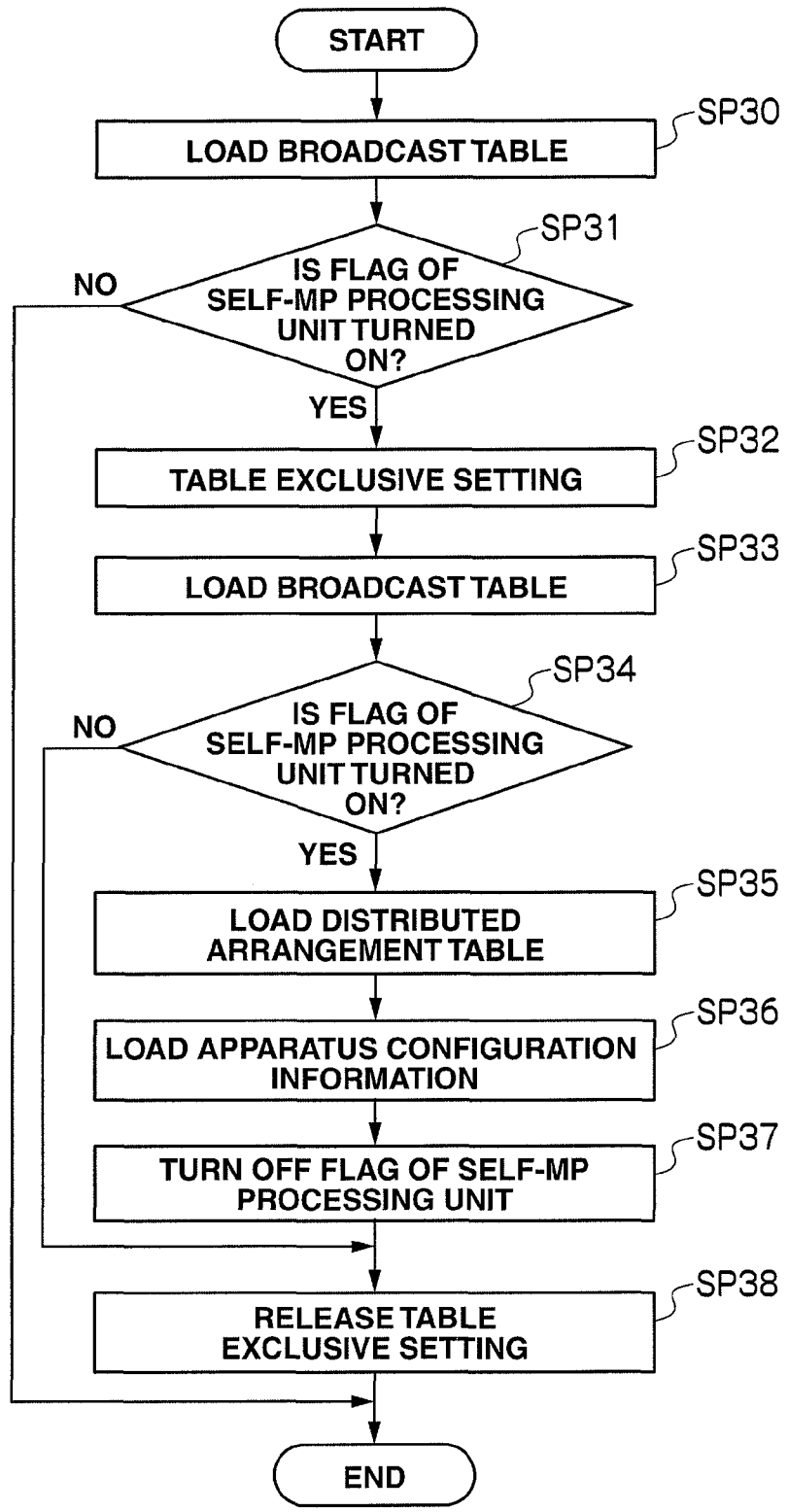
FIG. 7 is a flowchart showing a processing routine of table load processing.

FIG. 7 shows the specific processing contents of the microprocessor processing unit 14 concerning the table load processing for loading the distributed arrangement table 20 and the apparatus configuration information table 21. The microprocessor processing unit 14 periodically executes the table load processing according to a micro program stored in the memory 14B of the self-microprocessor processing unit.

Specifically, when the microprocessor processing unit 14 starts this table load processing, it foremost accesses the shared memory 16, and loads the broadcast table 23 stored in the broadcast table column 21G of the apparatus configuration information table 21 (SP30).

Subsequently, the microprocessor processing unit 14 refers to the loaded broadcast table 23, and determines whether the bits associated with the self-microprocessor processing unit are set to "ON" (SP31).

If the microprocessor processing unit 14 obtains a negative result in this determination, it ends this table load processing. Meanwhile, if the microprocessor processing unit 14 obtains a positive result in this determination, it performs exclusive setting to prevent the other microprocessor processing units 14 from updating the distributed arrangement table 20 and the apparatus configuration information table 21 in the shared memory 16 (SP32), and thereafter re-loads the broadcast table 23 from the shared memory 16 (SP33).

Subsequently, the microprocessor processing unit 14 determines whether the bits associated with the self-microprocessor processing unit in the broadcast table 23 loaded at step SP33 are set to "ON" (SP34).

If the microprocessor processing unit 14 obtains a negative result in this determination, it proceeds to step SP37. Meanwhile, if the microprocessor processing unit 14 obtains a positive result in this determination, it reads the latest distributed arrangement table 20 and the apparatus configuration information table 21 from the shared memory 16, and stores these tables in the memory 14B of the self-microprocessor processing unit (SP34, SP35).

The microprocessor processing unit 14 thereafter changes the bits associated with the self-microprocessor processing unit to "OFF" regarding the broadcast table 23 stored in the broadcast table column 21G of the apparatus configuration information table 21 in the shared memory 16 (SP36). The microprocessor processing unit 14 releases the exclusive setting to the distributed arrangement table 20 and the apparatus configuration information table 21 (SP37), and thereafter ends this table update processing.

Figure 8:
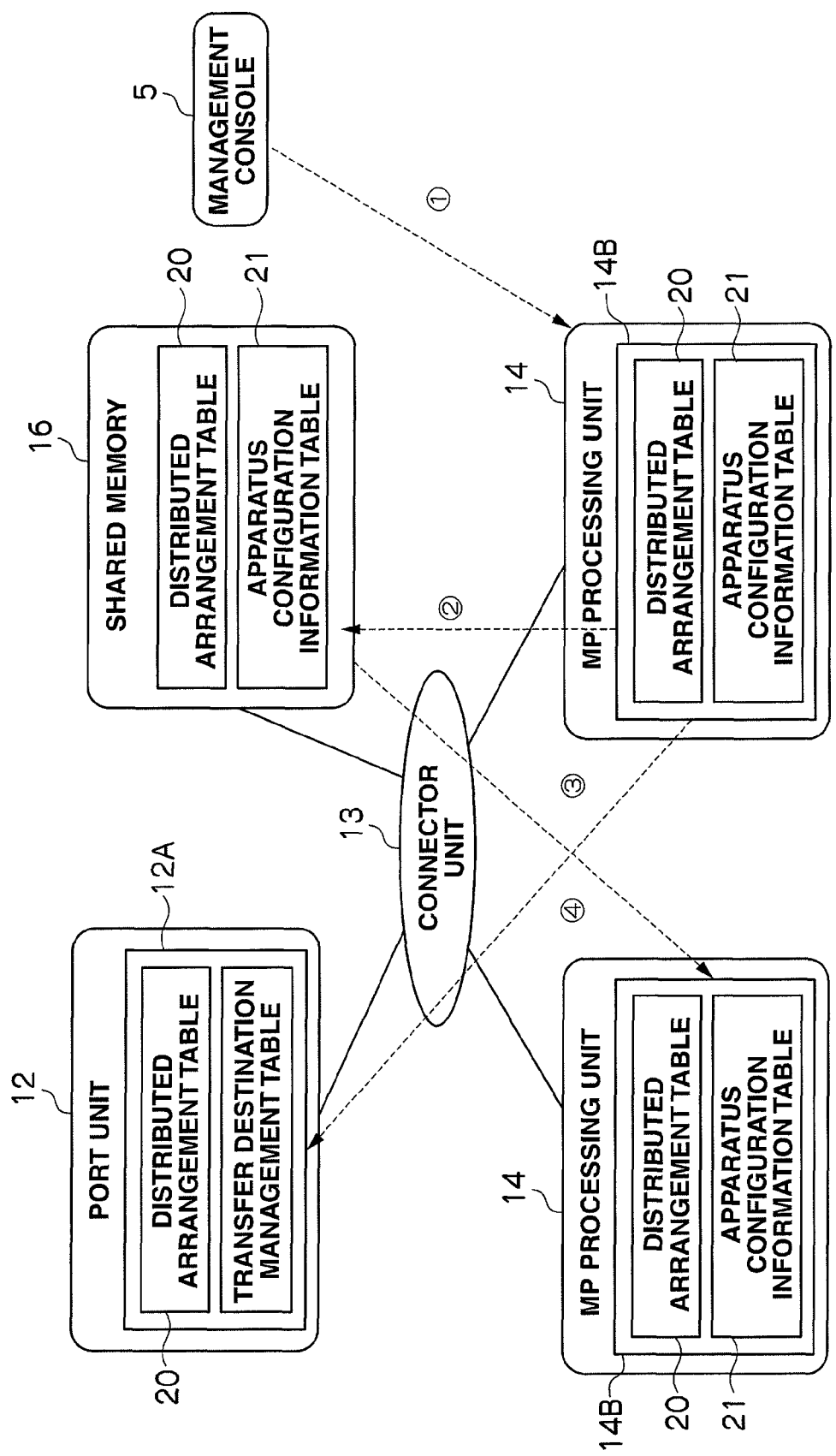
FIG. 8 is a conceptual diagram explaining a table arrangement.

As a result of performing this kind of sequential processing, as shown in FIG. 8, the distributed arrangement table 20 is retained in the memory 12A of each port unit 12, and the distributed arrangement table 20 and the apparatus configuration information table 21 are retained in the shared memory 16 and the memory 14B of each microprocessor processing unit 14. Here, the subject matter of the distributed arrangement table 20 retained in each port unit 12, the shared memory 16 and each microprocessor processing unit 14 is the same. The transfer destination management table 24 (FIG. 11) retained in the memory 12A of each port unit 12 will be described later.

(1-2-2-2) Table Re-setting Processing

Incidentally, a volatile memory is ordinarily used as the area to be used as the work memory among the memory 14B of each microprocessor processing unit 14 and the shared memory 16. Thus, if the power of the storage apparatus 4 is turned off, the distributed arrangement table 20 and the apparatus configuration information table 21 stored in the memory 14B of each microprocessor processing unit 14 and the shared memory 16 will disappear from the memory 14B of each microprocessor processing unit 14 and the shared memory 16.

In the case of this embodiment, when the power of the storage apparatus 4 is turned off, each microprocessor processing unit 14 moves and retains the distributed arrangement table 20 and the apparatus configuration information table 21 previously stored in the volatile work area of the memory 14B to and in a nonvolatile area of the memory 14. If the power of the storage apparatus 4 is turned on, the initially booted microprocessor processing unit 14 reads the distributed arrangement table 20 and the apparatus configuration information table 21 from the memory 14B of the self-microprocessor processing unit, and re-sets these tables in the shared memory 16.

Figure 9:
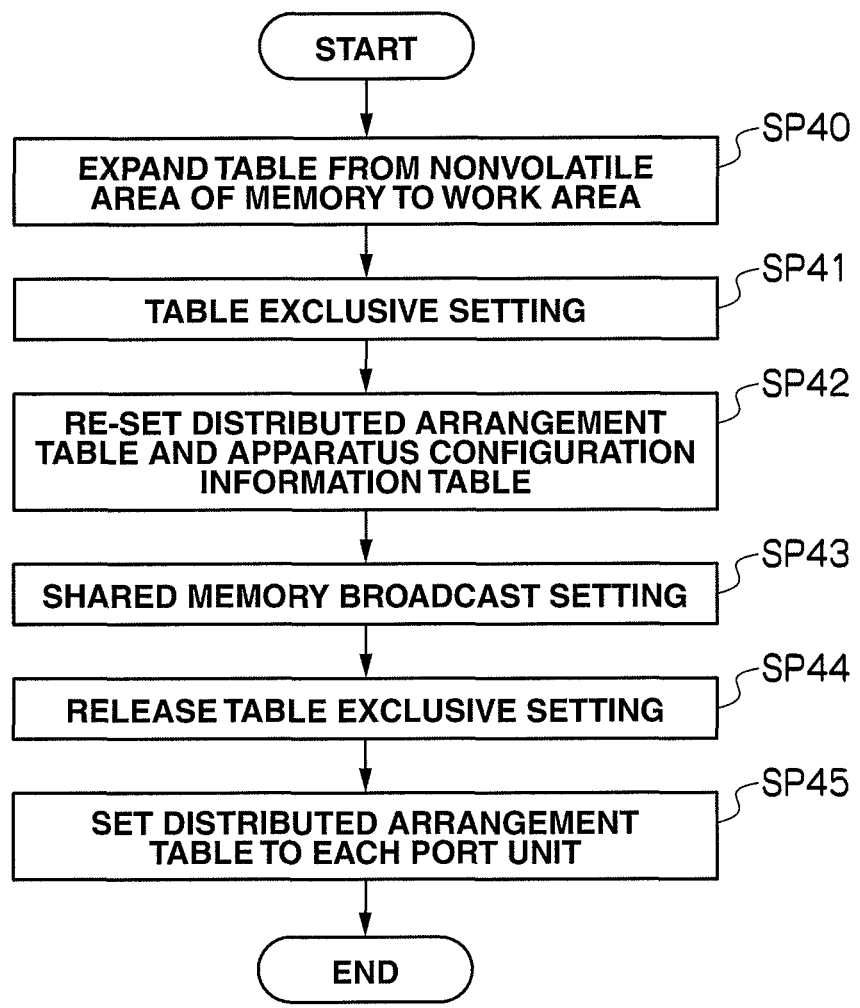
FIG. 9 is a flowchart showing a processing routine of table re-setting processing.

FIG. 9 shows the processing contents of the microprocessor processing unit 14 concerning the re-setting of the distributed arrangement table 20 and the apparatus configuration information table 21. The microprocessor processing unit 14 that is initially booted after the power of the storage apparatus 4 is turned on executes the table re-setting processing shown in FIG. 9 according to a micro program stored in the self-internal memory 14B.

Specifically, the microprocessor processing unit 14, after the boot processing, expands the distributed arrangement table 20 and the apparatus configuration information table 21 stored in the nonvolatile area of the memory 14B to the work area of the memory 14B (SP40).

Subsequently, the microprocessor processing unit 14 performs exclusive setting for preventing the other microprocessor processing units 14 or the like from updating the distributed arrangement table 20 and the apparatus configuration information table 21 in the shared memory 16 (SP41), and thereafter stores the distributed arrangement table 20 and the apparatus configuration information table 21 expanded in the work area of the memory 14B in the shared memory 16 (SP42).

Subsequently, the microprocessor processing unit 14 updates all bits associated with the microprocessor processing units 14 other than the self-microprocessor processing unit regarding the broadcast table 23 (FIG. 6) stored in the broadcast table column 21G of the apparatus configuration information table 21 stored in the shared memory 16 at step SP42 to "1," and thereafter releases the exclusive setting to the distributed arrangement table 20 and the apparatus configuration information table 21 of the shared memory 16 (SP44).

The microprocessor processing unit 14 sends the distributed arrangement table 20 re-set in the shared memory 16 at step SP42 to each port unit 12. Consequently, each port unit 12 will store the distributed arrangement table 20 sent from the microprocessor processing unit 14 in the self-internal memory 12A (SP45). The distributed arrangement table 20 is thereby re-set in each port unit 12. The microprocessor processing unit 14 thereafter ends this table re-setting processing.

(1-2-3) Data I/O Processing (1-2-3-1) Data I/O Request Transfer Processing

The specific processing flow of the data I/O processing to be performed in the storage apparatus 4 based on the distributed arrangement table 20 set in each port unit 12 and the shared memory 16 is now explained.

Figure 10:
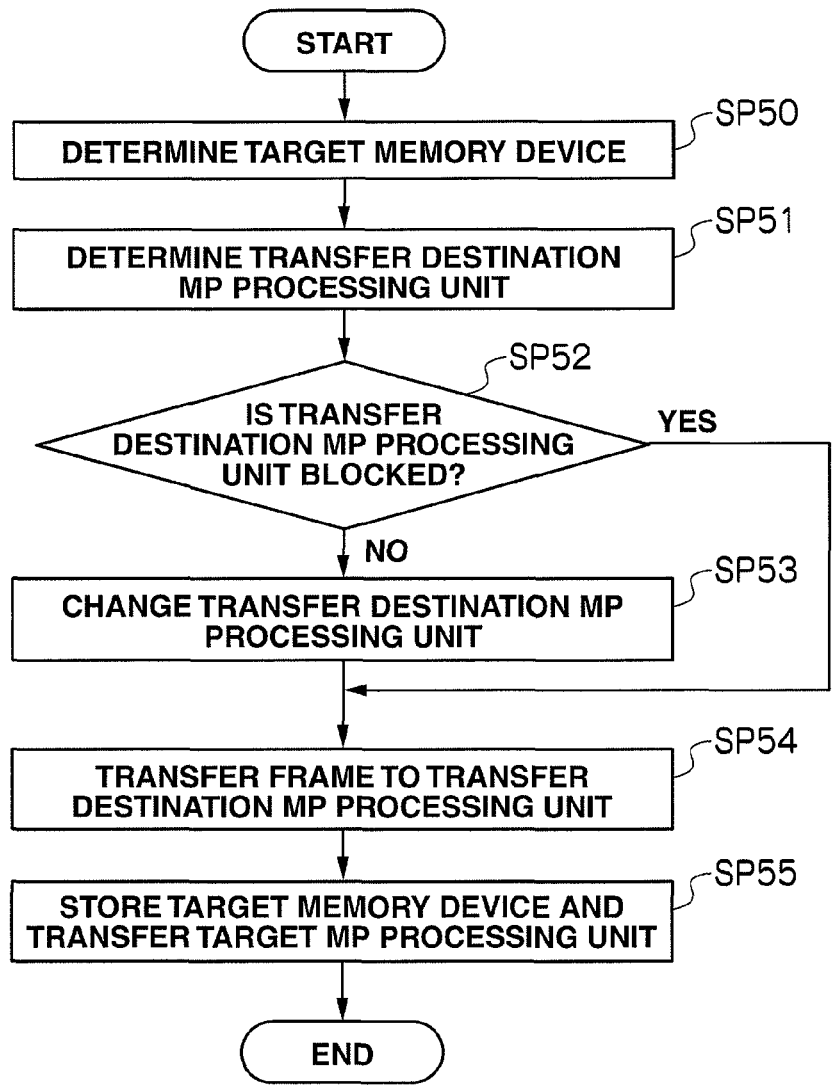
FIG. 10 is a flowchart showing the processing contents of a port unit concerning data I/O processing.

FIG. 10 shows the specific processing contents of the port 12 concerning the data I/O processing. Each port unit 12 executes the data I/O request transfer processing shown in FIG. 10 according to a control program stored in the memory 12A in the self-port unit.

Specifically, the port unit 12 starts the data I/O request transfer processing upon receiving a data I/O request from the host server 2, and foremost determines the memory device 10 to become the data I/O destination based on the received data I/O request (SP50).

Subsequently, the port unit 12 determines the microprocessor processing unit 14 to which the data I/O request should be transferred based on the determination result at step SP50 and the distributed arrangement table 20 retained in the self-internal memory 12A (SP51), thereafter refers to the apparatus configuration information table 21 stored in the shared memory 16, and then determines whether that microprocessor processing unit 14 is blocked (SP52).

If the port unit 12 obtains a positive result in this determination, it transfers the data I/O request to that microprocessor processing unit 14 (SP54). Meanwhile, if the port unit 12 obtains a negative result in this determination, it refers to the processing target memory device bitmap of each microprocessor processing unit 14 in the distributed arrangement table 20, determines the microprocessor processing unit 14 to become the new transfer destination of the data I/O request (SP53), and thereafter transfers the data I/O request to the determined microprocessor processing unit 14 (SP54).

Figure 11:
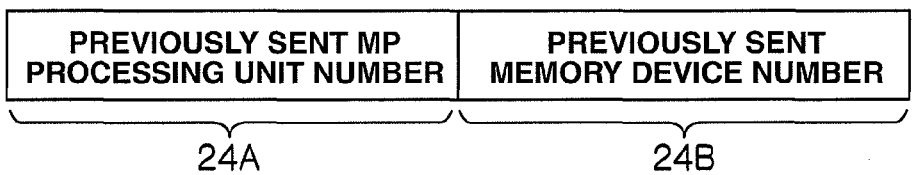
FIG. 11 is a conceptual diagram explaining a transfer destination management table.

Subsequently, the port unit 12 registers the identification number (microprocessor processing unit number) of the transfer destination microprocessor processing unit 14 of the data I/O request and the identification number (storage apparatus number) of the memory device 10 of the data I/O destination designated in the data I/O request respectively in the microprocessor processing unit number column 14A and the storage apparatus number column 14B of the transfer destination management table 24 shown in FIG. 11 retained in the memory 12A (SP55), and thereafter ends this data I/O request transfer processing.

Incidentally, upon determining the transfer destination microprocessor processing unit 14 at step SP53 of the data I/O request transfer processing, if the microprocessor processing unit 14 to become the transfer destination is determined by referring to the distributed arrangement table 20 from the top each time, there is a possibility that the determined microprocessor processing unit 14 may become biased. Thus, in the case of this embodiment, when the port unit 12 determines the transfer destination microprocessor processing unit 14 at step SP53, it refers to the transfer destination management table 24, and starts the search of the candidate microprocessor processing unit 14 to become the transfer destination from the microprocessor processing unit number and the storage apparatus number subsequent to the microprocessor processing unit number and the storage apparatus number registered in the transfer destination management table 24.

(1-2-3-2) Data I/O Execution Processing

Figure 12:
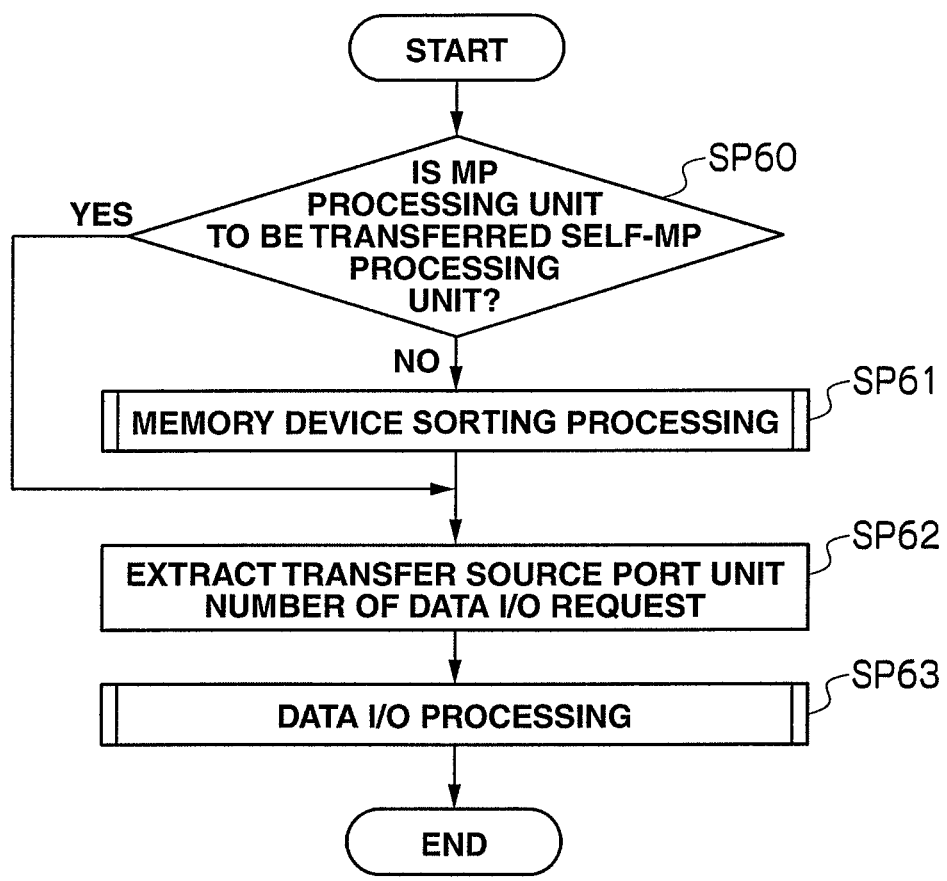
FIG. 12 is a flowchart showing a processing routine of data I/O execution processing.

Meanwhile, the specific processing contents of the microprocessor processing unit 14 concerning the data I/O processing are shown in FIG. 12. When the microprocessor processing unit 14 receives the data I/O request transferred from the port unit 12, it executes the data I/O execution processing shown in FIG. 12 according to a micro program stored in the memory 14B of the self-microprocessor processing unit.

Specifically, the microprocessor processing unit 14 starts the data I/O execution processing upon receiving the data I/O request, and foremost determines whether the microprocessor processing unit 14 to receive the data I/O request is the self-microprocessor processing unit based on the storage apparatus number of the memory device 10 of the data I/O destination contained in the data I/O request and the distributed arrangement table 20 stored in the memory 14B of the self-microprocessor processing unit (SP60).

To obtain a positive result in this determination means that the microprocessor processing unit 14 to receive the data I/O request under normal conditions is the self-microprocessor processing unit. Consequently, in this case, the microprocessor processing unit 14 proceeds to step SP62.

Meanwhile, to obtain a negative result in the determination at step SP60 means that the microprocessor processing unit 14 to receive the data I/O request under normal conditions is blocked. Consequently, in this case, the microprocessor processing unit 14 executes storage apparatus sorting processing for sorting the memory devices 10 allocated to the blocked microprocessor processing unit (hereinafter referred to as the "blocked microprocessor processing unit") 14 to other unblocked microprocessor processing units 14 (SP61).

Subsequently, the microprocessor processing unit 14 extracts and stores the identification number (port unit number) of the port unit 12 based on the frame information of the data I/O request transferred from the port unit 12 (SP62). The microprocessor processing unit 14 additionally executes data I/O processing according to the data I/O request (SP63), and thereafter ends this data I/O execution processing.

Figure 13:
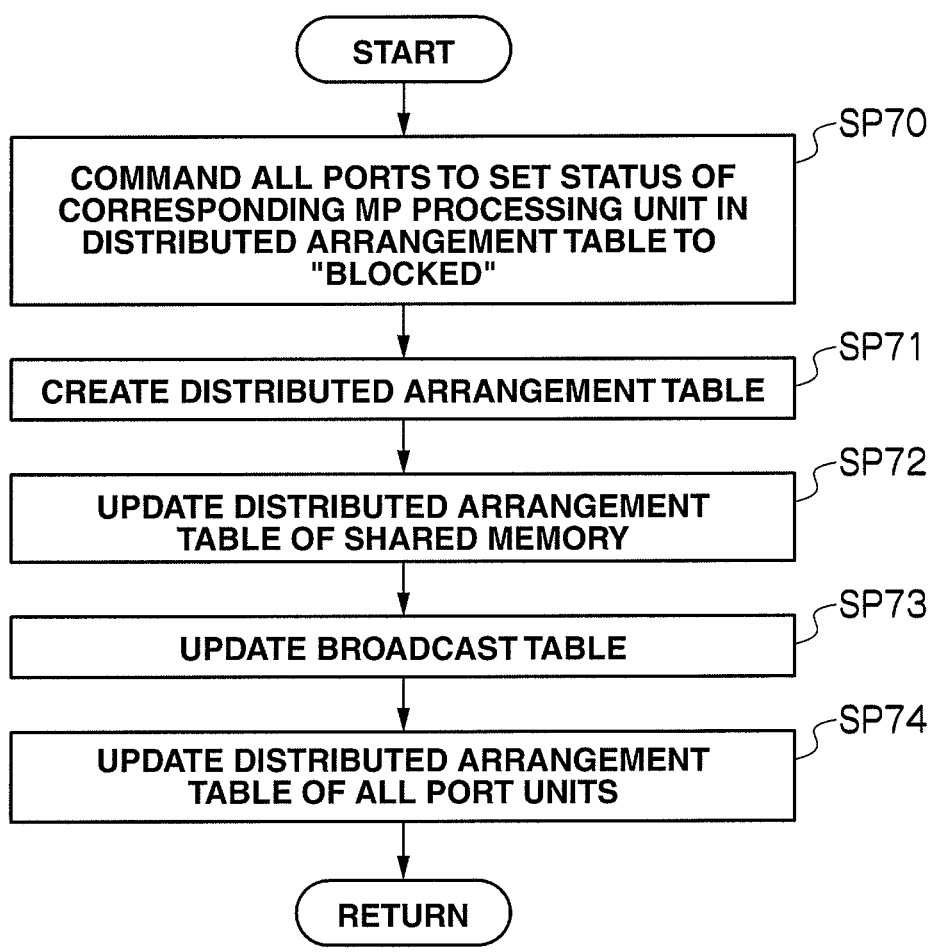
FIG. 13 is a flowchart showing a processing routine of storage apparatus sorting processing.

The specific processing contents of the microprocessor processing unit 14 concerning the storage apparatus sorting processing at step SP61 of the data I/O execution processing are shown in FIG. 13.

When the microprocessor processing unit 14 proceeds to step SP61 of FIG. 12, it starts the storage apparatus sorting processing shown in FIG. 13, and foremost commands all port units 12 to set the status of the blocked microprocessor processing unit 14 in the distributed arrangement table 20 retained in the port units 12 to "Blocked" in order to inhibit the new data I/O request to the blocked microprocessor processing unit 14 from being transferred to the other microprocessor processing units 14 (SP70).

Subsequently, the microprocessor processing unit 14 creates a new distributed arrangement table 20 that sorts the memory devices 10 allocated to the blocked microprocessor processing unit 14 to the other unblocked microprocessor processing units 14 (SP71). The microprocessor processing unit 14 writes the created distributed arrangement table 20 over the old distributed arrangement table 20 stored in the shared memory 16 (SP72).

Subsequently, the microprocessor processing unit 14 updates the broadcast table 23 stored in the broadcast table column 21G of the apparatus configuration information table 21 in the shared memory 16 so that the bits associated with the self-microprocessor processing unit are set to "OFF" and the bits associated with all other microprocessor processing units 14 are set to "ON" (SP73). Consequently, in accordance with this broadcast table 23, the microprocessor processing units 14 other than the foregoing microprocessor processing unit 14 will thereafter rewrite the distributed arrangement table 20 and the apparatus configuration information table 21 retained in the self-microprocessor processing unit with the new distributed arrangement table 20 and the apparatus configuration information table 21 stored in the shared memory 16 at such time.

The microprocessor processing unit 14 additionally sends the new distributed arrangement table 20 created at step SP71 to each port unit 12 (SP74). Consequently, each port unit 12 updates the distributed arrangement table 20 retained in the self-internal memory 12A by overwriting the new distributed arrangement table 20 that it received. The microprocessor processing unit 14 thereafter ends this storage apparatus sorting processing, and returns to the data I/O execution processing explained with reference to FIG. 12.

Figure 14:
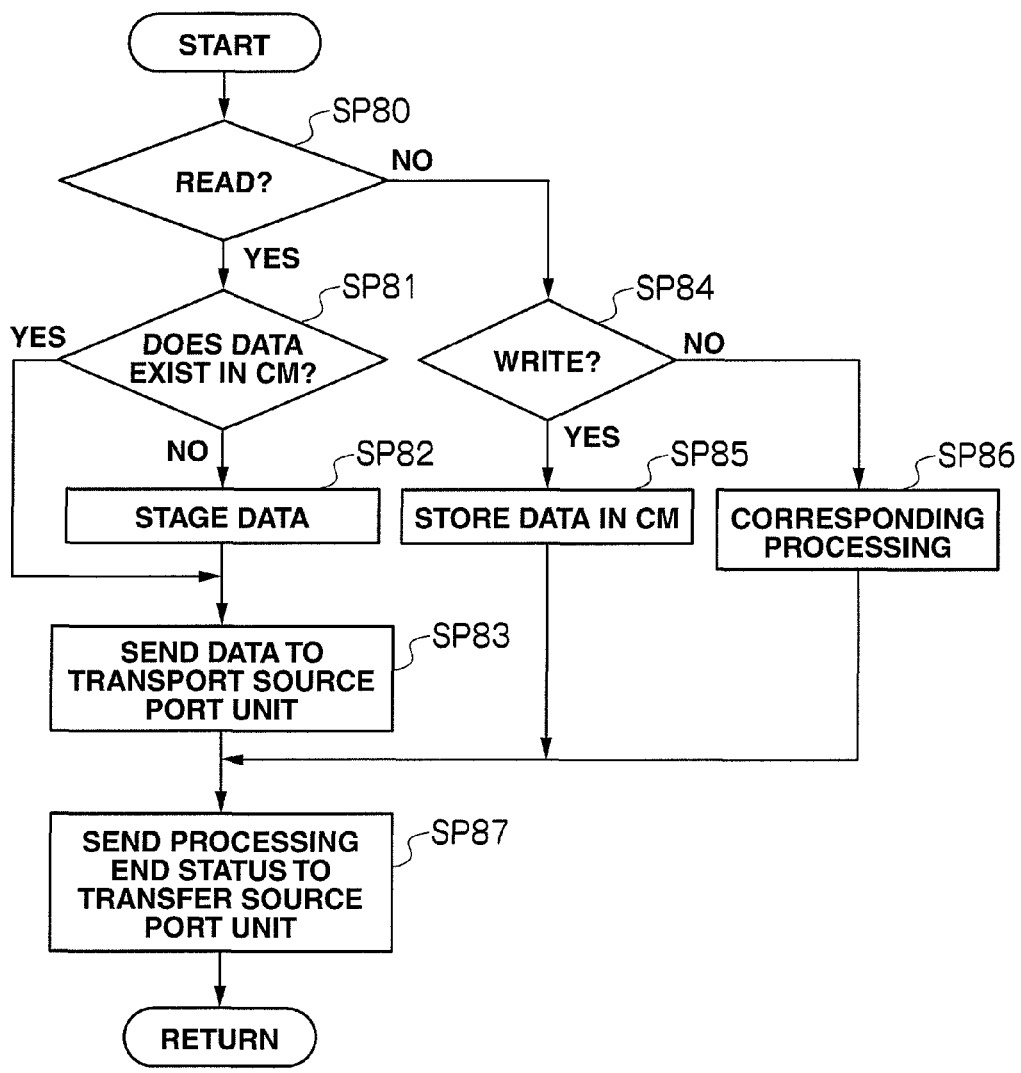
FIG. 14 is a flowchart showing a processing routine of data I/O processing.

The specific processing contents of the microprocessor processing unit 14 concerning the data I/O processing at step SP63 of the data I/O execution processing are shown in FIG. 14. When the microprocessor processing unit 14 proceeds to step SP63 of the data I/O execution processing, it starts this data I/O processing, and foremost determines whether the data I/O request is a read request (SP80).

If the microprocessor processing unit 14 obtains a positive result in this determination, it determines whether read target data exists in the cache memory 15 (SP81). The microprocessor processing unit 14 proceeds to step SP83 upon obtaining a positive result in this determination. Meanwhile, if the microprocessor processing unit 14 obtains a negative result in this determination, it accesses the memory device 10 storing the read target data and reads the designated data into the cache memory 15 (SP82).

Subsequently, the microprocessor processing unit 14 reads the read target data from the cache memory 15, and transfers this to the port 12 that transferred the data I/O request (SP83). The microprocessor processing unit 14 additionally sends the processing end status to the corresponding host server 5 via the port unit 12 (SP87), thereafter ends this data I/O processing, and then returns to the data I/O execution processing (FIG. 12).

Meanwhile, if the microprocessor processing unit 14 obtains a negative result in the determination at step SP80, it determines whether the data I/O request is a write request (SP84). If the microprocessor processing unit 14 obtains a positive result in this determination, it stores the data in the cache memory 15 (SP85), sends the processing end status to the corresponding host server 5 via the corresponding port unit 12 (SP87), thereafter ends this data I/O processing, and then returns to the data I/O execution processing (FIG. 12).

Meanwhile, if the microprocessor processing unit 14 obtains a negative result in the determination at step SP84 (i.e., if the data I/O request is neither a read request or a write request), it executes processing according to the data I/O request (SP86), and sends the processing end status to the corresponding host server 5 via the corresponding port unit 12 (SP87). The microprocessor processing unit 14 thereafter ends this data I/O processing and then returns to the data I/O execution processing (FIG. 12).

(1-2-4) Maintenance Processing (1-2-4-1) Maintenance Block Processing

Incidentally, when replacing the microprocessor processing unit 14 in the storage apparatus 4 of this embodiment, the user is able to block the target microprocessor processing unit (hereinafter referred to as the "maintenance target microprocessor processing unit") 14 by using the management console 5 and issuing a command to the storage apparatus 4.

Here, the maintenance target microprocessor processing unit 14 updates the distributed arrangement table 20 of each port unit 12, each microprocessor processing unit 14 and the shared memory 16 so as to sort the memory devices 10 allocated to the self-microprocessor processing unit to the other microprocessor processing units 14, and is thereafter blocked.

Figure 15:
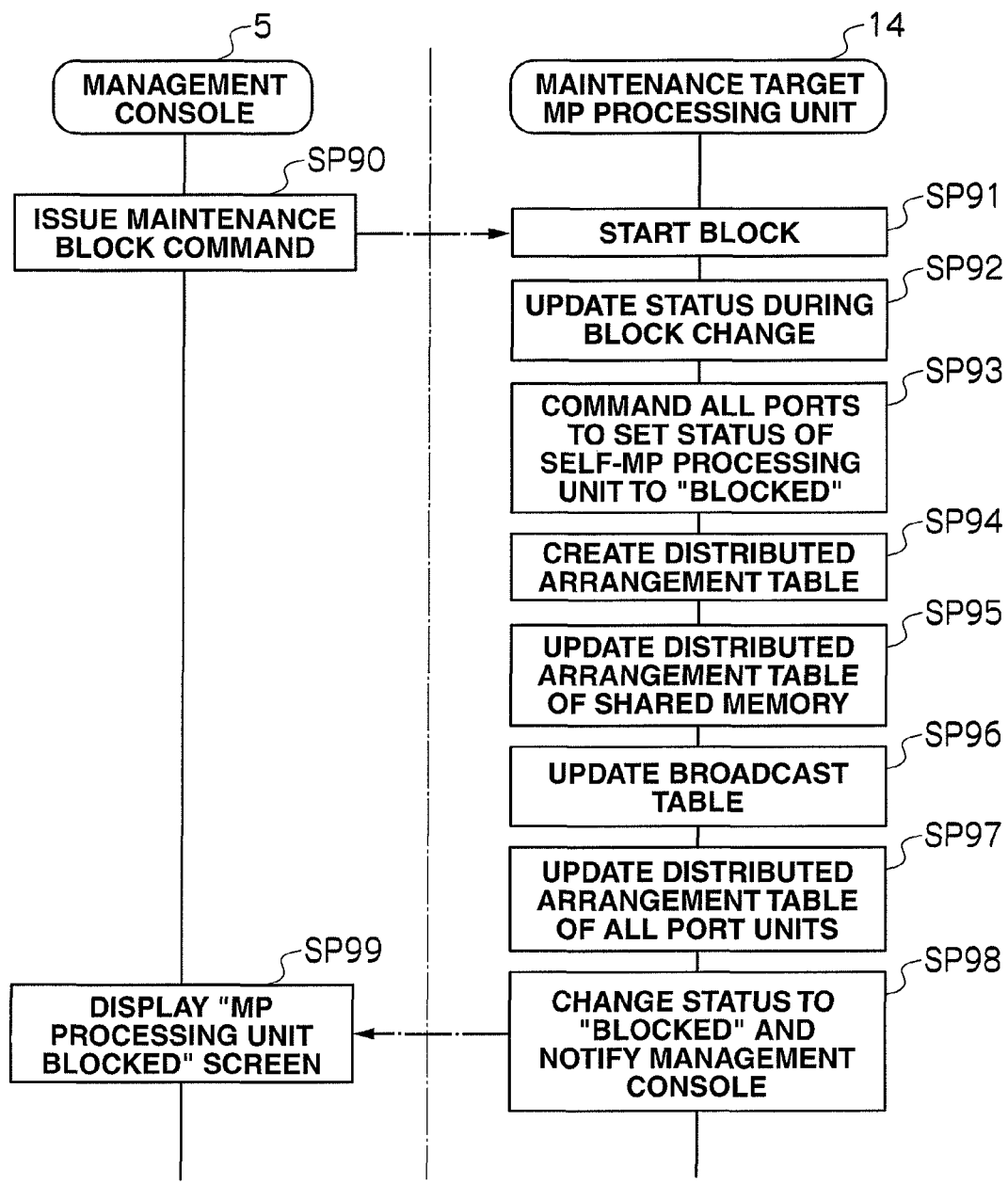
FIG. 15 is a flowchart showing a processing flow of a management console and a maintenance target microprocessor processing unit concerning maintenance block processing.

FIG. 15 shows the sequential processing flow of the management console 5 and the maintenance target microprocessor processing unit 14 concerning the maintenance block processing.

Here, the management console 5 foremost issues a maintenance blockage command to the maintenance target microprocessor processing unit 14 designated according to the user operation (SP90).

The maintenance target microprocessor processing unit 14 that received this maintenance blockage command starts the block processing (SP91), and foremost changes the status of the self-microprocessor processing unit in the apparatus configuration information table 21 stored in the shared memory 16 to "Moving to Block" (SP92). Specifically, the bits associated with the self-microprocessor processing unit among the respective bits configuring the status bitmap stored in the microprocessor processing unit status bitmap column 21I (FIG. 3) of the apparatus configuration information table 21 to "ON."

Subsequently, the maintenance target microprocessor processing unit 14 commands all port units 12 to set the status of the self-microprocessor processing unit in the distributed arrangement table 20 retained in the port unit 12 to "Blocked" in order to inhibit the new data I/O request to the self-microprocessor processing unit from being transferred to the other microprocessor processing units 14 (SP93).

Subsequently, the maintenance target microprocessor processing unit 14 creates a new distributed arrangement table 20 that sorts the memory devices 10 allocated to the self-microprocessor processing unit to the other microprocessor processing units 14 (SP94), and writes the created distributed arrangement table 20 over the old distributed arrangement table 20 stored in the shared memory 16 (SP95).

The maintenance target microprocessor processing unit 14 additionally updates the broadcast table 23 (FIG. 6) stored in the broadcast table column 21G of the apparatus configuration information table 21 in the shared memory 16 so that the bits associated with the self-microprocessor processing unit are set to "OFF" and the bits associated with all other microprocessor processing units 14 are set to "ON" (SP96). Consequently, in accordance with this broadcast table 23, the microprocessor processing units 14 other than the foregoing maintenance target microprocessor processing unit 14 will thereafter rewrite the distributed arrangement table 20 and the apparatus configuration information table 21 retained in the self-microprocessor processing unit with the new distributed arrangement table 20 and the apparatus configuration information table 21 stored in the shared memory 16 at such time.

The microprocessor processing unit 14 thereafter sends the new distributed arrangement table 20 created at step SP94 to each port unit 12 (SP97). Consequently, each port unit 12 updates the distributed arrangement table 20 retained in the self-internal memory 12A by overwriting the new distributed arrangement table 20 that it received.

The maintenance target microprocessor processing unit 14 thereafter updates the status corresponding to the self-microprocessor processing unit in the apparatus configuration information table 21 stored in the shared memory 16 from "Moving to Block" to "Blocked," notifies the management console 5 that the status of the self-microprocessor processing unit has been changed to "Blocked," and is thereafter blocked (SP98).

When the management console 5 receives this notice, it displays a "microprocessor processing unit blocked" screen showing that the maintenance target microprocessor processing unit 14 has been blocked (SP99).

(1-2-4-2) Micro Replacement Processing

In the case of the storage apparatus 4 in this embodiment, when replacing the micro programs of the microprocessor processing unit 14 with a new version, the target microprocessor processing unit (maintenance target microprocessor processing unit) 14 can be blocked by the user using the management console 5 and issuing a command to the storage apparatus 4.

Here, the maintenance target microprocessor processing unit 14 updates the distributed arrangement table 20 of each port unit 12, each microprocessor processing unit 14 and the shared memory 16 so as to sort the memory devices 10 allocated to the self-microprocessor processing unit to the other microprocessor processing units 14, and is thereafter blocked.

After the maintenance target microprocessor processing unit 14 is blocked, it replaces the micro programs retained in the memory 14B of the self-microprocessor processing unit. After this replacement is complete, the maintenance target microprocessor processing unit 14 updates the distributed arrangement table 20 of each port unit 12, each microprocessor processing unit 14 and the shared memory 16 so as to re-allocate the memory devices 10 to perform the data I/O processing to the self-microprocessor processing unit.

Figure 16:
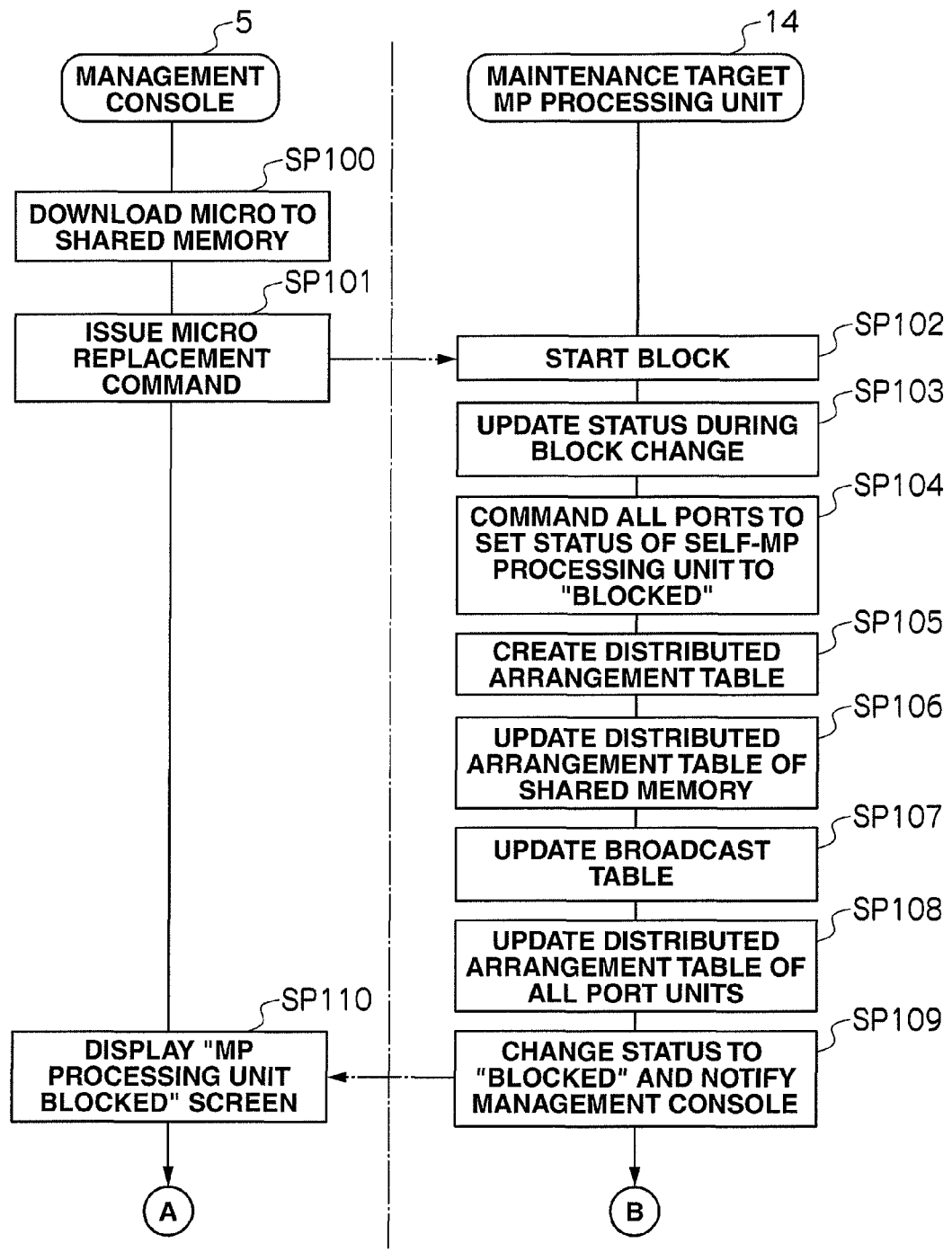
FIG. 16 is a flowchart showing a processing flow of a management console and a maintenance target microprocessor processing unit concerning micro replacement processing.
Figure 17:
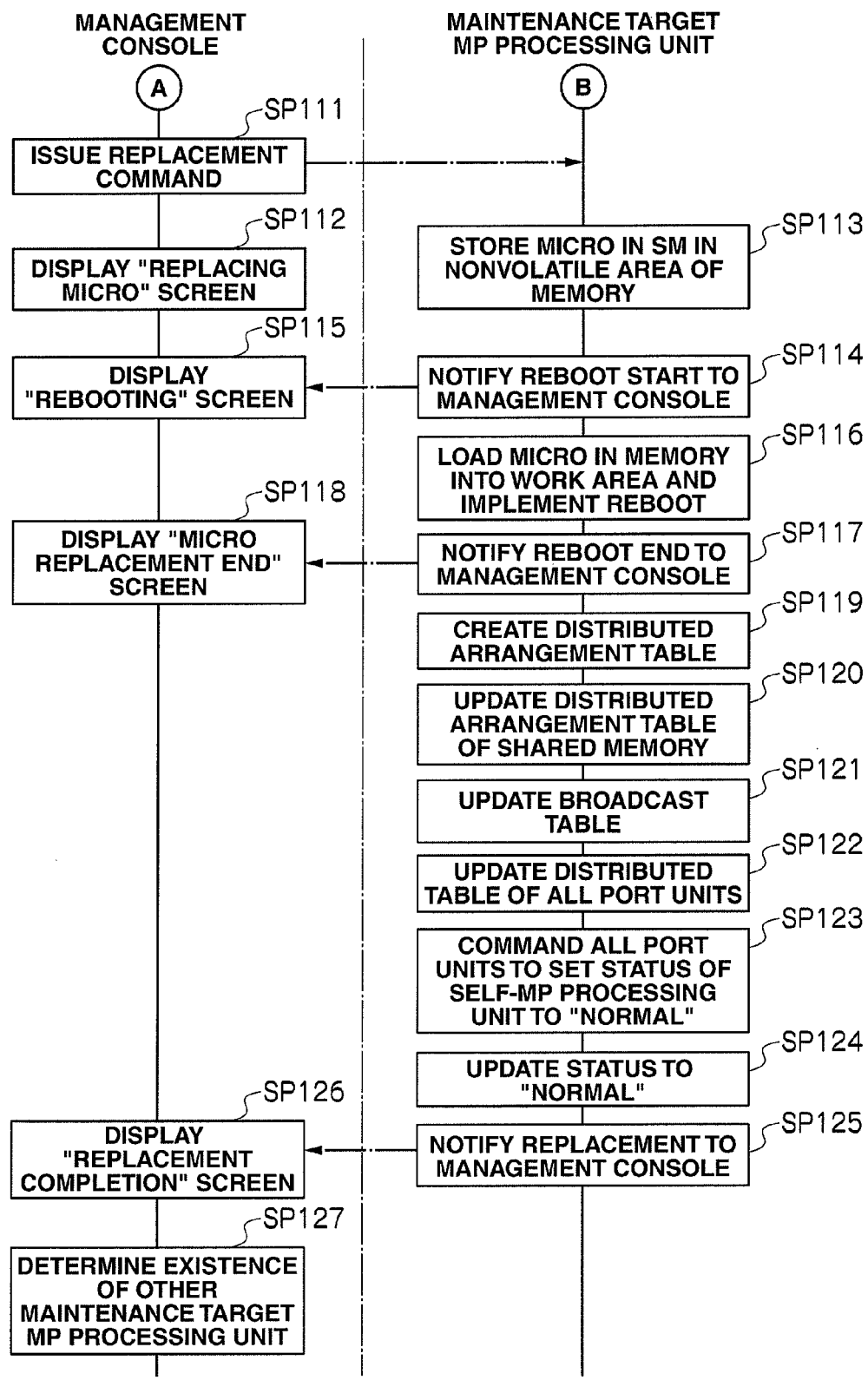
FIG. 17 is a flowchart showing a processing flow of a management console and a maintenance target microprocessor processing unit concerning micro replacement processing.

FIG. 16 and FIG. 17 show the sequential processing flow concerning this kind of micro program replacement processing (hereinafter referred to as the "micro replacement processing"). In this case, the management console 5 stores the new micro programs in the shared memory according to the user operation (SP100), and thereafter issues a micro program replacement command to the designated maintenance target microprocessor processing unit 14 (SP101).

Meanwhile, the maintenance target microprocessor processing unit 14 that received the micro program replacement command from the management console 5 executes the maintenance block processing (SP91 to SP98) explained with reference to FIG. 15 to update the distributed arrangement table 20 retained in each port unit 12, each microprocessor processing unit 14 and the shared memory 16 so as to sort the memory devices 10 allocated to the self-microprocessor processing unit to the other microprocessor processing units 14, and is thereafter blocked (SP102 to SP109).

When the management console 5 receives a notice from the maintenance target microprocessor processing unit 14 to the effect that the status of the self-microprocessor processing unit has been changed to "Blocked," it displays a "microprocessor processing unit blocked" screen showing that the maintenance target microprocessor processing unit 14 is blocked (SP110).

Subsequently, the management console 5 issues a replacement command to the maintenance target microprocessor processing unit 14 for replacing the micro program (SP111), and simultaneously displays a "replacing micro" screen showing that the micro programs of the maintenance target microprocessor processing unit 14 are being replaced (SP112).

Meanwhile, the maintenance target microprocessor processing unit 14 that received the replacement command reads the micro programs stored in the shared memory 16 by the management console 5 at step SP100, and stores such micro programs in a nonvolatile area of the memory 14B in the self-microprocessor processing unit (SP113).

Subsequently, the maintenance target microprocessor processing unit 14 notifies the reboot start to the management console 5 (SP114). The management console 5 that received this notice display a "rebooting" screen showing that the maintenance target microprocessor processing unit 14 is being rebooted (SP115).

Subsequently, the maintenance target microprocessor processing unit 14 implements reboot processing for rebooting (SP116), and, after this reboot processing is ended, notifies the management console 5 to such effect (SP117). Consequently, the management console 5 that received this notice displays a "micro replacement end" screen showing that the reboot of the maintenance target microprocessor processing unit 14 has ended (SP118).

Subsequently, the maintenance target microprocessor processing unit 14 creates a new distributed arrangement table 20 that re-allocated the memory devices 10 to perform the data I/O processing to the self-microprocessor processing unit (SP119), and writes the created distributed arrangement table 20 over the old distributed arrangement table 20 stored in the shared memory 16 (SP120).

The maintenance target microprocessor processing unit 14 updates the broadcast table 23 (FIG. 6) stored in the shared memory 16 so that the bits associated with the self-microprocessor processing unit are set to "OFF" and the bits associated with the other microprocessor processing units 14 are set to "ON" (SP121). Consequently, in accordance with this broadcast table 23, the microprocessor processing units 14 other than the foregoing maintenance target microprocessor processing unit 14 will thereafter rewrite the distributed arrangement table 20 and the apparatus configuration information table 21 retained in the self-microprocessor processing unit with the new distributed arrangement table 20 and the apparatus configuration information table 21 stored in the shared memory 16 at such time.

The maintenance target microprocessor processing unit 14 additionally sends the new distributed arrangement table 20 created at step SP119 to each port unit 12 (SP122). Consequently, each port unit 12 updates the distributed arrangement table 20 retained in the self-internal memory 12A by overwriting the new distributed arrangement table 20 that it received.

Subsequently, the maintenance target microprocessor processing unit 14 commands all port units 12 to set the status of the self-microprocessor processing unit in the distributed arrangement table 20 retained in the port unit 12 to "Normal" (SP123), and updates the status corresponding to the self-microprocessor processing unit of the apparatus configuration information table 21 stored in the shared memory 16 from "Blocked" to "Normal" (SP124).

The maintenance target microprocessor processing unit 14 additionally notifies the completion of the micro program replacement processing to the management console 5 (SP125), and then ends this micro program replacement processing.

Meanwhile, the management console 5 that received this notice displays a "replacement completion" screen showing that the replacement of the micro programs of the maintenance target microprocessor processing unit 14 has ended (SP126), and thereafter determines whether there are other microprocessor processing units (other maintenance target microprocessor processing units) 14 in which micro programs need to be replaced (SP127).

If there are other maintenance target microprocessor processing units 14 in which micro programs should be replaced, the management console 7 issues the micro program replacement command explained with reference to step SP101 to the maintenance target microprocessor processing unit 14. As a result, the maintenance target microprocessor processing unit 14 and the management console 5 perform the processing at step SP102 to step SP126.

The management console 5 repeats the same processing to all maintenance target microprocessor processing units 14 in which micro programs are to be replaced. Consequently, the micro programs of all corresponding maintenance target microprocessor processing units 14 are replaced. When the management console eventually completes the micro program replacement processing of all corresponding maintenance target microprocessor processing units 14, it ends this micro replacement processing.

(1-2-5) Failure Monitoring Processing

Figures 18, 19:
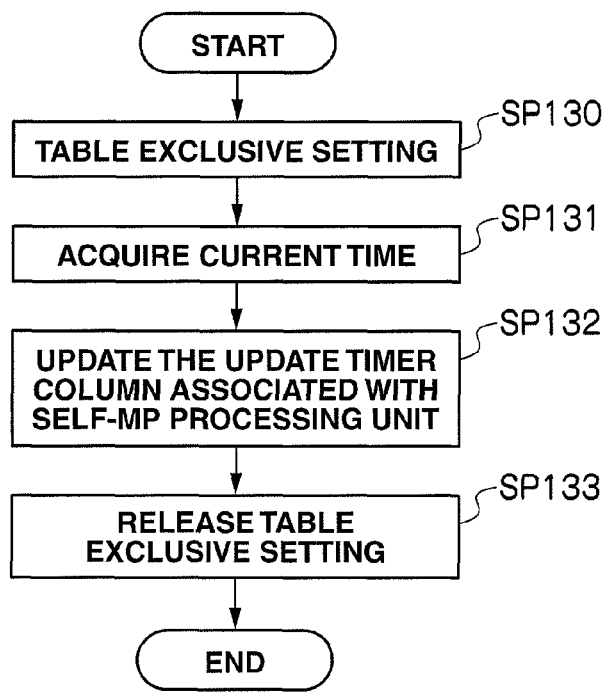
FIG. 18 is a conceptual diagram explaining a failure monitoring table.
FIG. 19 is a flowchart showing a processing routine of time update processing.

The failure monitoring processing is now explained. In the case of this embodiment, the shared memory 16 stores a failure monitoring table 25 provided by the update timer column 25A associated to the respective microprocessor processing units 14 in the storage apparatus 4 as shown in FIG. 18. Then each microprocessor processing unit 14 updates, each given period of time, the time that it was stored in the update timer column 25A associated with the self-microprocessor processing unit in the failure monitoring table 25 to the current time.

Each microprocessor processing unit 14 also periodically checks the value of each update timer column 25A associated with the other microprocessor processing unit 14 in the failure monitoring table 25. If there is an update timer column 25A that has not been updated for a given period of time, the microprocessor processing unit 14 determines that the microprocessor processing unit 14 associated with that update timer column 25A is being blocked due to a failure, and updates the distributed arrangement table 20 retained in each port unit 12, each microprocessor processing unit 14 and the shared memory 16 so as to sort the memory devices 10 allocated to that microprocessor processing unit 14 to the other remaining microprocessor processing units 14.

FIG. 19 shows the processing contents of the microprocessor processing unit 14 upon updating the time of the update timer column 25A associated with the self-microprocessor processing unit in the failure monitoring table 25 among the steps of the foregoing failure monitoring processing. The microprocessor processing unit 14 executes the time update processing shown in FIG. 19 according to a micro program stored in the memory 14B.

Specifically, the microprocessor processing unit 14 periodically starts this time update processing, and foremost performs exclusive setting to prevent the other microprocessor processing units 16 from accessing the failure monitoring table 25 in the shared memory 16 (SP130), and thereafter acquires the current time from a timer now shown provided to the control unit 11 of the storage apparatus 4 (SP131).

Subsequently, the microprocessor processing unit 14 updates the time stored in the update timer column 25A by writing the current time acquired at step SP131 over the update timer column 25A associated with the self-microprocessor processing unit in the failure monitoring table 25 (SP132). The microprocessor processing unit 14 releases the exclusive setting to the failure monitoring table 25 (SP133), and thereafter ends this time update processing.

Figure 20:
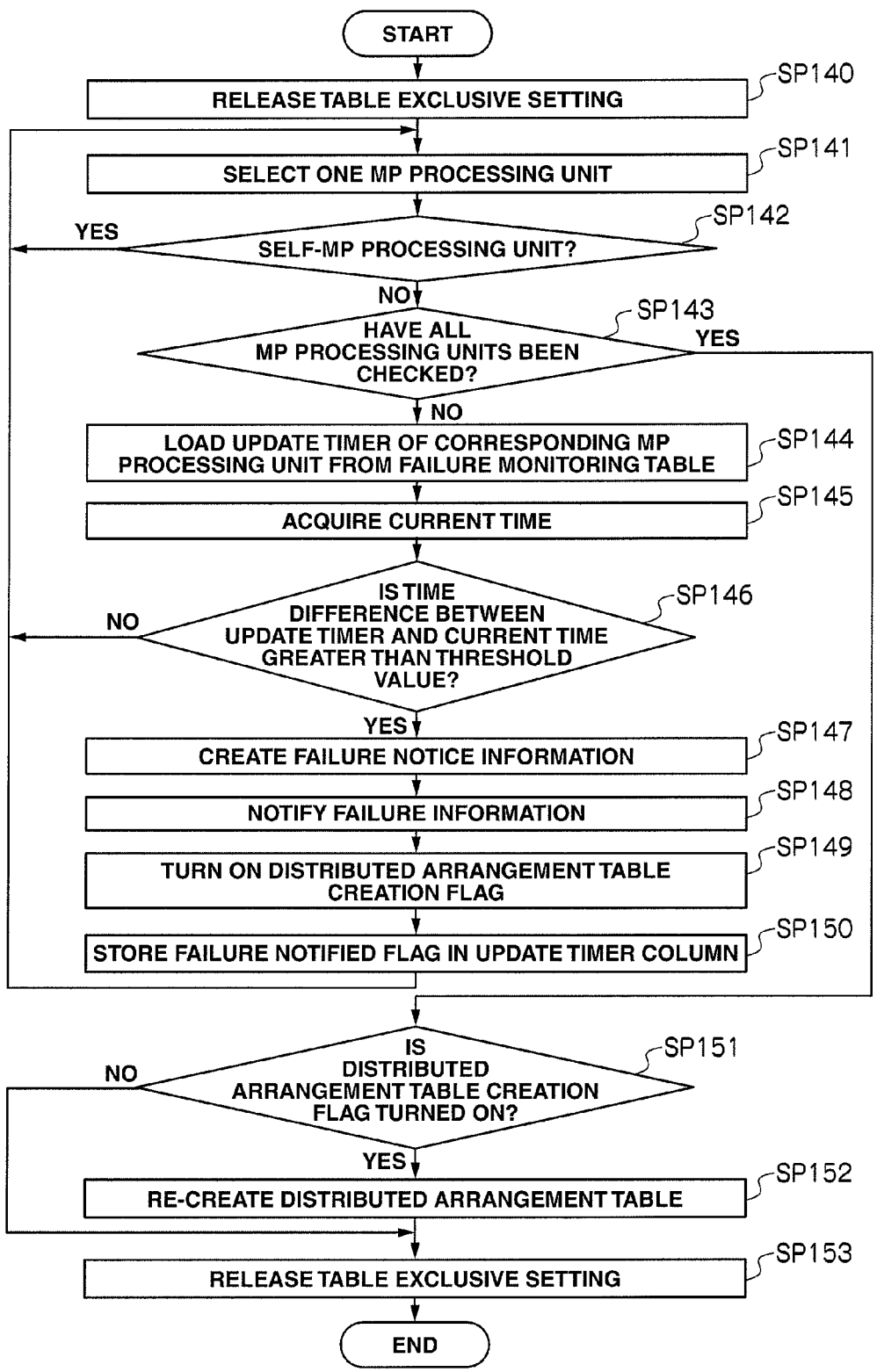
FIG. 20 is a flowchart showing a processing routine of failure monitoring and table update processing.

Meanwhile, FIG. 20 shows the specific processing contents of the microprocessor processing unit 14 upon monitoring the status of failure in the other microprocessor processing unit 14 based on the failure monitoring table 25 among the steps of the foregoing failure monitoring processing. The microprocessor processing unit 14 executes the failure monitoring and table update processing shown in FIG. 20 according to a micro program stored in the memory 14B.

Specifically, the microprocessor processing unit 14 periodically (for instance, every 5 seconds) stars the failure monitoring and table update processing, and foremost performs exclusive setting in order to prevent the other microprocessor processing units 14 from accessing the failure monitoring table 25 in the shared memory 16 (SP140), thereafter selects one update timer column 25A (SP141), and then determines whether that update timer column 25A is an update timer column 25A associated with the self-microprocessor processing unit (SP142).

If the microprocessor processing unit 14 obtains a positive result in this determination, it returns to step SP141 and selects another update timer column 25A. Meanwhile, if the microprocessor processing unit 14 obtains a negative result in this determination, it determines whether the execution of the processing of step SP144 to step SP150 described later has ended regarding all update timer columns 25A of the failure monitoring table 25 (SP143).

If the microprocessor processing unit 14 obtains a negative result in this determination, it reads the time that it was stored in the target update timer column 25A (update timer column 25A selected at step SP141) of the failure monitoring table 25 (SP144), and acquires the current time from the foregoing timer in the control unit 11 (SP145).

Subsequently, the microprocessor processing unit 14 compares the time acquired at step SP144 and the current time acquired at step SP145, and determines whether the different is greater than a given period of time (for instance, 5 minutes) (SP146).

If the microprocessor processing unit 14 obtains a negative result in this determination, it returns to step SP141. The microprocessor processing unit 14 also returns to step SP141 if a failure notified flag described later is stored in the update timer column 25A at step SP150.

Meanwhile, if the microprocessor processing unit 14 obtains a positive result in this determination, it creates failure information indicating that the microprocessor processing unit 14 associated with the target update time column 25A is blocked due to a failure (SP147), and sends this failure information to the management console 5 (SP148).

Subsequently, the microprocessor processing unit 14 sets a distributed arrangement table creation flag corresponding to the microprocessor processing unit 14 associated with the target update time column 25A among the flags (hereinafter referred to as the "distributed arrangement table creation flags") provided in correspondence to each microprocessor processing unit 14 being managed in the memory 14B of the self-microprocessor processing unit to "ON (1)" (SP149).

Subsequently, the microprocessor processing unit 14 stores a prescribed failure notified flag meaning that failure information has been notified to the management console 5 in the target update time column 25A of the failure monitoring table 25 (SP150). This is in order to prevent the microprocessor processing unit 14 from subsequently once again notifying failure information to the effect that a failure has occurred in the microprocessor processing unit 14 associated with that update time column 25A to the management console 5.

The microprocessor processing unit 14 returns to step SP141, thereafter sequentially switches the target update flag column 25A to the other update flag columns 25A, and repeats the same processing until it obtains a positive result at step SP143 (SP141 to SP150-SP141).

When the microprocessor processing unit 14 eventually obtains a positive result at step SP143 as a result of completing the check of all microprocessor processing units 14, it determines whether the distributed arrangement table creation flag corresponding to one of the microprocessor processing units 143 is "ON" (SP151).

The microprocessor processing unit 14 proceeds to step SP153 obtaining a negative result in this determination. Meanwhile, if the microprocessor processing unit 14 obtains a positive result in this determination, it executes the distributed arrangement table recreation processing (SP152).

Specifically, the microprocessor processing unit 14 creates a new distributed arrangement table 20 that sorts the memory devices 10 allocated to each microprocessor processing unit 14 in which the distributed arrangement table creation flag is set to "ON" to each microprocessor processing unit 14 in which the distributed arrangement table creation flag is set to "OFF," and overwrites this in the distributed arrangement table 20 in the shared memory 16.

Among the respective bits in the broadcast table 23 (FIG. 6) stored in the shared memory 16, the microprocessor processing unit 14 sets the bits associated with the self-microprocessor processing unit to "ON" and sets the bits associated to all other microprocessor processing units 14 to "OFF." Consequently, in accordance with this broadcast table 23, the microprocessor processing units 14 other than the foregoing maintenance target microprocessor processing unit 14 will thereafter rewrite the distributed arrangement table 20 retained in the self-microprocessor processing unit with the new distributed arrangement table 20 stored in the shared memory 16 at such time.

The microprocessor processing unit 14 additionally sends the new distributed arrangement table 20 created as described above to each port unit 12. Consequently, each port unit 12 updates the distributed arrangement table 20 retained in the self-internal memory 12A by overwriting the new distributed arrangement table 20 that it received.

Subsequently, the microprocessor processing unit 14 releases the exclusive setting to the failure monitoring table 25 (SP153), and thereafter ends this failure monitoring and table update processing.

(1-2-6) Storage Apparatus Re-allocation Processing

Figure 21:
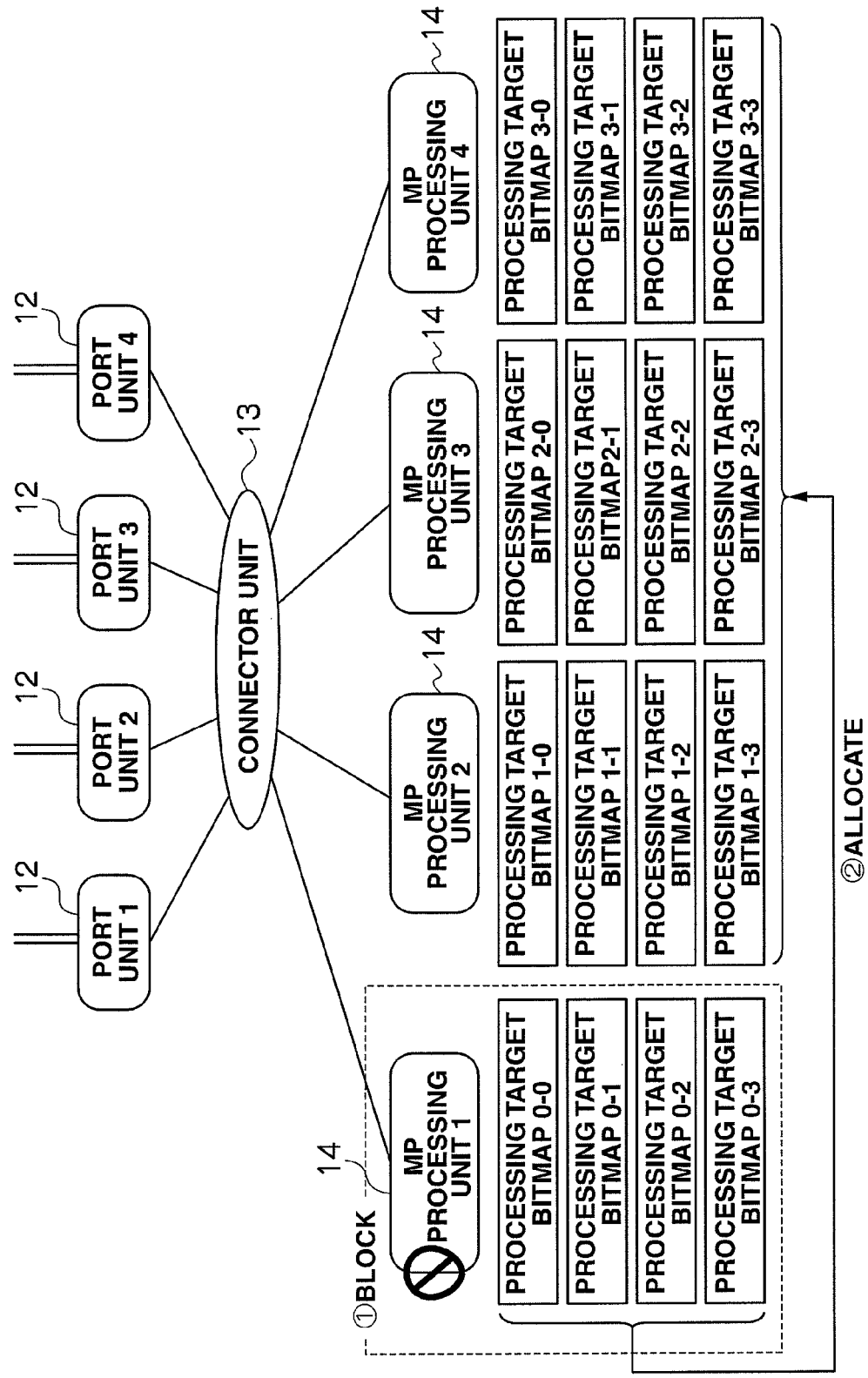
FIG. 21 is a conceptual diagram explaining storage apparatus sorting processing.

Meanwhile, there are two methods for sorting the memory devices 10 allocated to the blocked microprocessor processing unit 14 or the microprocessor processing unit 14 to be blocked to the other microprocessor processing unit 14 as shown in FIG. 21 at step SP71 of the storage apparatus sorting processing explained with reference to FIG. 13, at step SP94 of the maintenance block processing explained with reference to FIG. 15, and at step SP152 of the failure monitoring and table update processing explained with reference to FIG. 20.

The first method is to equally sort the memory devices 10 allocated to each microprocessor processing unit 14 so that the number of memory devices 10 will be the same. The second method is to sort the memory devices 10 so that the load of the respective microprocessor processing units 14 will be equal in accordance with the load status of each microprocessor processing unit 14 based on the utilization of each memory device 10. The latter method is adopted in this embodiment.

As the means for realizing this method, the shared memory 16 stores, as shown in FIG. 22, a storage apparatus utilization management table 26 provided with a utilization column 26A associated with each memory device 10. Each microprocessor processing unit 14 stores the number of times that the data I/O request accepted for each memory device 10 allocated to the self-microprocessor processing unit as the utilization of the memory device 10, and increments by one the value stored in the corresponding utilization column 26A of the storage apparatus utilization management table 26 each time the data I/O request is processed.

When the microprocessor processing unit 14 is to sort the memory devices 10 allocated to the blocked microprocessor processing unit 14 or the microprocessor processing unit 14 to be blocked to the other microprocessor processing units, it refers to the storage apparatus utilization management table 26, and creates the microprocessor processing unit utilization management table 27 shown in FIG. 23.

The microprocessor processing unit utilization management table 27 is configured from a microprocessor processing unit number column 27A, a processing target memory device count column 27B, and a storage apparatus utilization accumulation column 27C. The microprocessor processing unit number column 27A stores the microprocessor processing unit number of each microprocessor processing unit 14, and the processing target memory device count column 27B stores the number of storage apparatuses allocated to that microprocessor processing unit 14. The storage apparatus utilization accumulation column 27C stores the utilization (data I/O count per unit time) of that microprocessor processing unit 14.

The microprocessor processing unit 14 sorts, based on the created microprocessor processing unit utilization management table 27, the storage apparatuses allocated to the blocked microprocessor processing unit 14 or the microprocessor processing unit 14 to be blocked to the other microprocessor processing units 14 so that the load of each of the operating microprocessor processing units 14 is equalized; more specifically, so that the utilization of each microprocessor processing unit 14 is equalized.

Meanwhile, when operating a newly replaced microprocessor processing unit 14 due to a blockage cause by a failure or the like, the user commands the storage apparatus 4, via the management console 5, to allocate the memory devices 10 to the microprocessor processing unit 14 (hereinafter referred to as the "storage apparatus allocation command").

Figure 24:
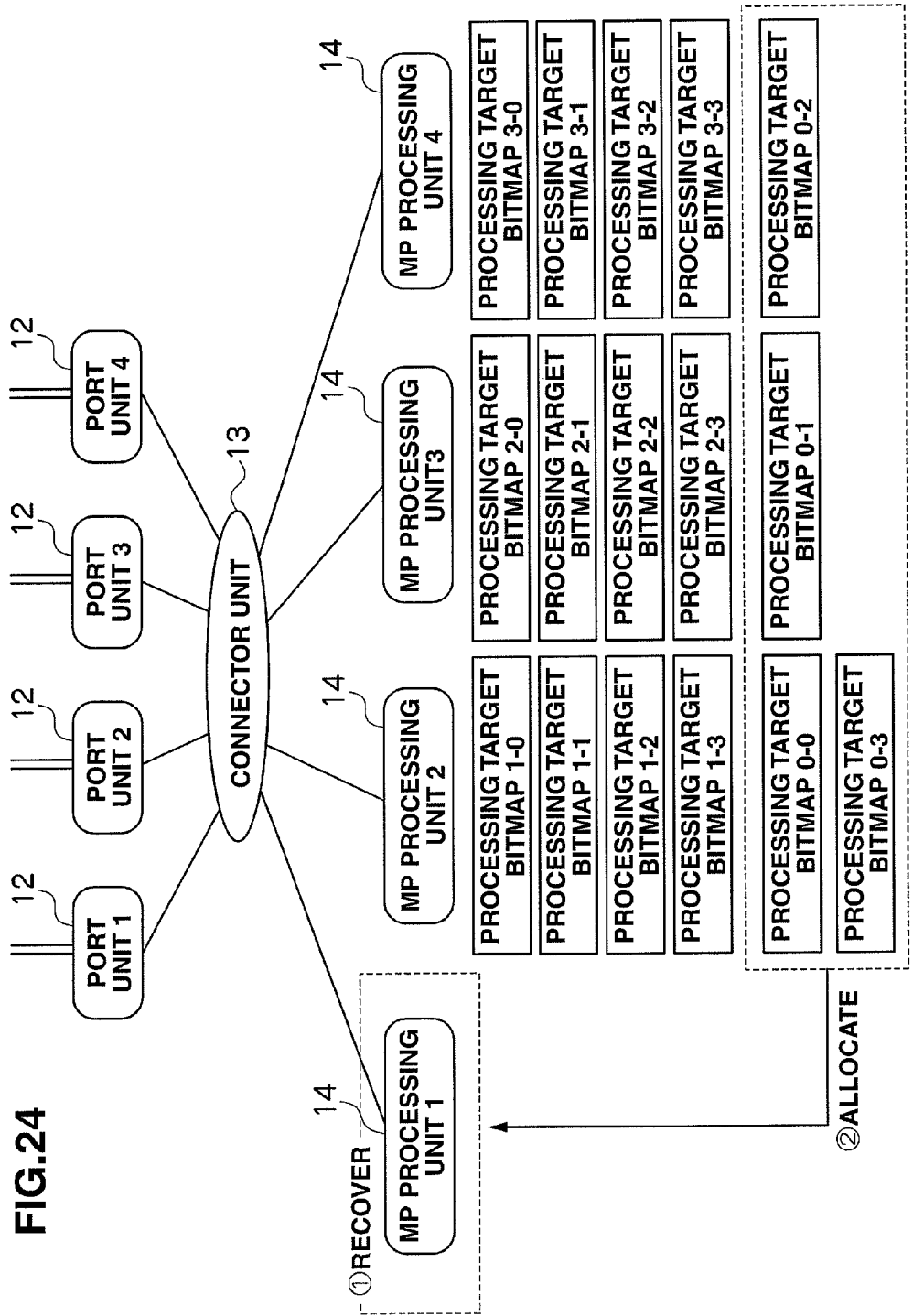
FIG. 24 is a conceptual diagram explaining storage apparatus re-sorting processing.

The microprocessor processing unit 14 of the storage apparatus 4 that received this storage apparatus allocation command, as shown in FIG. 24, allocates the memory devices 10 to the newly replaced microprocessor processing units so that the load of the respective microprocessor processing units 14 including the newly replaced microprocessor processing unit 14 is equalized. As the memory devices 10 to be allocated to the new microprocessor processing unit 14, the memory devices 10 that were allocated to the microprocessor processing unit 14 before the original microprocessor processing unit 14 was blocked due to a failure or other memory devices 10 may be allocated.

(1-3) Effect of Present Embodiment

As described above, with the storage system 1, while the data I/O requests from the host server 2 are sorted to the corresponding microprocessor processing unit 14 according to the distributed arrangement table 20 in the port unit 12 on the one hand, when one of the microprocessor processing units 14 is blocked due to a failure or the like, the distributed arrangement table 20 of each port unit 12 is updated so that the memory devices 10 allocated to the blocked microprocessor processing unit 14 are dynamically sorted to the other microprocessor processing units 14, even if the microprocessor processing unit 14 is blocked due to a failure or the like, it is possible to perform data I/O processing without disruption to the storage apparatus or the storage area that was allocated to the blocked processing unit and without the load being concentrated on certain processing units among the other processing units. Consequently, it is possible to realize a storage controller and a storage control method capable of improving fault tolerance.

Here, since the memory devices 10 allocated to the blocked microprocessor processing unit 14 are sorted to the other microprocessor processing unit 14 for equalizing the load of the other microprocessor processing units 14, the deterioration of the data I/O performance as the overall storage apparatus 4 can be effectively prevented.

(2) Second Embodiment

Figure 25:
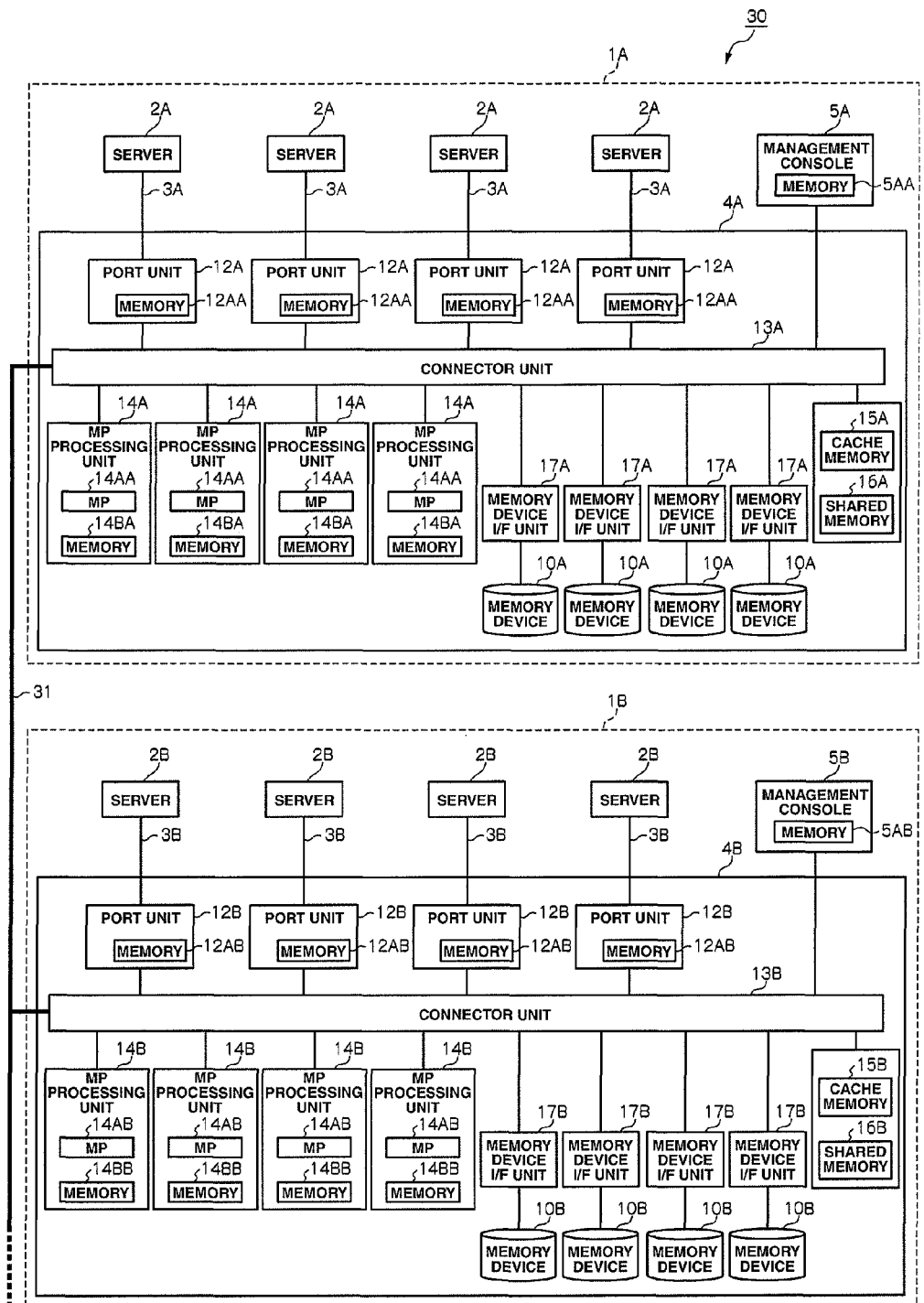
FIG. 25 is a block diagram explaining the configuration of a storage system according to the second embodiment.

FIG. 25, in which suffix "A" or "B" is added to the reference numerals to components corresponding to the components in FIG. 1, shows a storage system 30 according to the second embodiment. The storage system 30 is configured by a plurality of storage system units 1A, 1B having the same configuration as the storage system 1 (FIG. 1) according to the first embodiment being connected via a communication cable 31.

As this communication cable 31, an FC cable, an IP cable or a dedicated line may be used. However, when using an FC cable or an IP cable as the communication cable 31, an interface such as a conversion connector must be provided between the communication cable 31 and the respective storage system units 1A, 1B.

The data I/O operation in this storage system 30 is performed using the same distributed arrangement table (refer to FIG. 2) as the first embodiment stored in each port unit 12A, 12B, each microprocessor processing unit 14A, 14B and the shared memories 16A, 16B of the storage apparatuses 4A, 4B in the respective storage system units 1A, 1B.

In reality, when each port unit 12A, 12B of the storage apparatuses 4A, 4B in the respective storage system units 1A, 1B receives a data I/O request from the host servers 2A, 2B, as with the first embodiment, refers to the distributed arrangement table to determine the transfer destination microprocessor processing units 14A, 14B, and transfers the data I/O request to the specified microprocessor processing units 14A, 14B.

Here, when the port units 12A, 12B were not able to detect microprocessor processing unit 14A, 14B as candidates to become the transfer destination in the distributed arrangement table, they transfer that data I/O request to arbitrary or specified microprocessor processing units 14A, 14B of other storage system units 1A, 1B via the communication cable 31. Thereby, each host server 2A, 2B accesses, in addition to the self-connected storage apparatuses 4A, 4B, the storage apparatuses 4B, 4A of the other storage system units 1B, 1A.

According to the foregoing storage system of this embodiment, in addition to the effects attained in the first embodiment, the system expandability can be improved dramatically.

(3) Other Embodiments

Although the foregoing embodiments explained a case of applying the control unit 11 of the storage apparatus 4 as the storage controller for performing data I/O control to the memory device 10 to the storage system 1 configured as shown in FIG. 1, the present invention is not limited to the foregoing configuration, and various other configurations can be broadly applied as the configuration of the storage controller.

Although the foregoing embodiments explained a case where only one microprocessor 14A is loaded as the processing unit for performing the data I/O to the memory devices 10 in one microprocessor processing unit 14, the present invention is not limited to the foregoing configuration, and the present invention can also be applied to a case where a plurality of microprocessors 14A are loaded in one microprocessor processing unit 14. Here, in addition to allocating a memory device 10 to each microprocessor 14A, the entries of the distributed arrangement table 20 and the failure monitoring table 25 are made to be in microprocessor 14A units, and the port unit 21 sorts the data I/O requests from the host server 2 in microprocessor 14A units. The memory devices 10 allocated to the blocked microprocessor 14A can be sorted to an unblocked microprocessor 14A. Consequently, even if a failure occurs in one microprocessor 14A in the microprocessor processing unit 14 as a single package, it is possible to effectively prevent the load from concentrating on the other microprocessors 14A in the same package and the data I/O performance from deteriorating.

Although the foregoing embodiments explained a case of allocating the target of performing the data I/O processing to the microprocessor processing units 14 (microprocessors 14A) in memory device units, the present invention is not limited to the foregoing configuration, and the target of performing the data I/O processing may be allocated to each microprocessor 14 in volume (storage area) units set in the memory devices 10. In this case, the processing target memory device bitmap column 20D of the distributed arrangement table 20 stores a bitmap provided with bitmaps associated with each volume, and the volumes allocated to the failed microprocessor processing unit 14 can be sorted to the other microprocessors 4 in volume units.

The present invention relates to a storage controller and a storage control method, and can be broadly applied to storage apparatuses of various configurations that independently separate a port unit that functions as an interface to a host and a microprocessor that performs data I/O processing to the storage apparatus for configuring hardware settings.

What is claimed is:

1. A storage controller, comprising:
a plurality of port units, each of which functions as an interface to a host system; and
a plurality of processing units each for inputting and outputting data to and from a corresponding storage apparatus according to a data I/O request given from the host system via one of the port units;
wherein each of the port units retains a table pre-defining the storage apparatus or a storage area in the storage apparatus to perform data I/O processing allocated to each of the processing units, and sorts the data I/O requests given from the host system to the corresponding processing units according to the table;
wherein a first one of the processing units inputs data in the corresponding storage apparatus or the corresponding storage area according to the data I/O request sorted to itself from one of the port units and, upon detecting a blockage of a second one of the processing units due to a failure, updates the table retained in each of the port units so as to sort the storage apparatuses or the storage areas allocated to the second processing unit to the first processing unit.

2. The storage controller according to claim 1,
wherein each of the processing units periodically stores the current time in a shared memory accessible by each of the processing units, and periodically determines the blockage status of each of the other processing units due to a failure based on the time stored in the shared memory by each of the other processing units.

3. The storage controller according to claim 2,
wherein the port unit transferring the data I/O request transfers the data I/O request to one of the other processing units when the transfer destination processing unit is unable to receive the data I/O request; and
wherein the processing unit that received the data I/O request determines whether the processing unit that should have received the data I/O request under normal circumstances is blocked due to a failure based on the current time stored in the shared memory by the processing unit.

4. The storage controller according to claim 3,
wherein the transferring port unit selects a new transfer destination processing unit among the processing units registered in the table and transfers the data I/O request to the selected processing unit when the transfer destination processing unit is unable to receive the data I/O request, stores an identifier of the transfer destination processing unit and an identifier of the data I/O destination storage apparatus or storage area based on the data I/O request, and, upon subsequently transferring the data I/O request to the selected processing unit, selects a new transfer destination processing unit among the processing units registered in the table based on the stored identifier of the transfer destination processing unit of the previous data I/O request and the identifier of the data I/O destination storage apparatus or storage area based on the data I/O request.

5. The storage controller according to claim 1,
wherein the first processing unit updates the table retained in each of the port units so as to sort the storage apparatuses or the storage areas allocated to itself to an unblocked processing unit upon being blocked according to an external command.

6. The storage controller according to claim 1,
wherein the table is created by a prescribed processing unit based on setting information of a user according to instructions from the user, and set in each of the port units.

7. The storage controller according to claim 6,
wherein, when the number of storage apparatuses to be allocated to each of the processing units is designated by the user, the prescribed processing unit allocates the number of storage apparatuses to each of the processing units according to the designation, and, when the number of storage apparatuses to be allocated to each of the processing units is not designated by the user, the prescribed processing unit equally allocates the storage apparatuses to each of the processing units.

8. A storage control method in a storage controller comprising a plurality of port units, each of which functions as an interface to a host system, and a plurality of processing units each for inputting and outputting data to and from a corresponding storage apparatus according to a data I/O request given from the host system via one of the port units, comprising:
a first step of each of the port units sorting the data I/O requests given from the host system to the corresponding processing units according to a table pre-defining the storage apparatus or a storage area in the storage apparatus to perform data I/O processing allocated to each of the processing units; and
a second step of a first one of the processing units inputting data in the corresponding storage apparatus or the corresponding storage area according to the data I/O request sorted to itself from one of the port units and, upon detecting a blockage of a second one of the processing units due to a failure, updating the table retained in each of the port units so as to sort the storage apparatuses or the storage areas allocated to the second processing unit to the first processing unit.

9. The storage control method according to claim 8,
wherein each of the processing units periodically stores the current time in a shared memory accessible by each of the processing units, and periodically determines the blockage status of each of the other processing units due to a failure based on the time stored in the shared memory by each of the other processing units.

10. The storage control method according to claim 9,
wherein the port unit transferring the data I/O request transfers the data I/O request to one of the other processing units when the transfer destination processing unit is unable to receive the data I/O request; and
wherein the processing unit that received the data I/O request determines whether the processing unit that should have received the data I/O request under normal circumstances is blocked due to a failure based on the current time stored in the shared memory by the processing unit.

11. The storage control method according to claim 10,
wherein, at the first step, the transferring port unit selects a new transfer destination processing unit among the processing units registered in the table and transfers the data I/O request to the selected processing unit when the transfer destination processing unit is unable to receive the data I/O request, stores an identifier of the transfer destination processing unit and an identifier of the data I/O destination storage apparatus or storage area based on the data I/O request, and, upon subsequently transferring the data I/O request to the selected processing unit, selects a new transfer destination processing unit among the processing units registered in the table based on the stored identifier of the transfer destination processing unit of the previous data I/O request and the identifier of the data I/O destination storage apparatus or storage area based on the data I/O request.

12. The storage control method according to claim 8,
wherein the first processing unit updates the table retained in each of the port units so as to sort the storage apparatuses or the storage areas allocated to itself to an unblocked processing unit upon being blocked according to an external command.

13. The storage control method according to claim 8,
wherein the table is created by a prescribed processing unit according to instructions from a user, and set in each of the port units.

14. The storage control method according to claim 13,
wherein, when the number of storage apparatuses to be allocated to each of the processing units is designated by the user, the prescribed processing unit allocates the number of storage apparatuses to each of the processing units according to the designation, and, when the number of storage apparatuses to be allocated to each of the processing units is not designated by the user, the prescribed processing unit equally allocates the storage apparatuses to each of the processing units.

\* \* \* \* \*